United States Patent
Nagano et al.

(10) Patent No.: US 6,433,615 B2
(45) Date of Patent: Aug. 13, 2002

(54) SEMICONDUCTOR DEVICE HAVING A SENSOR WITH THE TEMPERATURE COMPENSATION FUNCTION

(75) Inventors: Shuichi Nagano, Numazu (JP); Horst-Lothar Fiedler, Duisburg (DE)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/879,904

(22) Filed: Jun. 14, 2001

Related U.S. Application Data

(63) Continuation of application No. PCT/JP99/06992, filed on Dec. 13, 1999.

(51) Int. Cl.[7] ............................................... H03K 3/42
(52) U.S. Cl. .................................... 327/513; 327/530
(58) Field of Search ............................ 327/20, 52, 63, 327/17, 512, 513, 530

(56) References Cited

U.S. PATENT DOCUMENTS

| | | | | |
|---|---|---|---|---|
| 4,004,462 A | * | 1/1977 | Dobkin ....................... | 323/226 |
| 5,085,526 A | * | 2/1992 | Sawtell et al. ............... | 327/512 |
| 5,143,452 A | * | 9/1992 | Maxedon et al. ........... | 327/512 |
| 5,440,520 A | * | 8/1995 | Schutz et al. ............... | 257/467 |
| 6,255,892 B1 | * | 7/2001 | Gartner et al. .............. | 327/512 |

FOREIGN PATENT DOCUMENTS

| | | |
|---|---|---|
| JP | 197883 | 12/1982 |
| JP | 351118 | 8/1991 |
| WO | 9602849 A1 | 2/1996 |

* cited by examiner

Primary Examiner—Terry D. Cunningham
(74) Attorney, Agent, or Firm—Birch, Stewart, Kolasch & Birch, LLP

(57) ABSTRACT

A sensor 1 produces an output that changes linearly with absolute temperature. In response to the output, a reference voltage generator 13 produces reference voltages Vhigh and Vlow that change linearly with absolute temperature. A Schmidt trigger 14 compares the output signal from a sensor signal amplifier 12 with the reference voltages for performing on-off output. A sensor signal amplifier 12 with a temperature-independent amplification factor amplifies the output signal from the sensor 1 while performing offset compensation. A sensor signal processing circuit 2 is formed out of thin-film silicon disposed on an insulating substrate. The output from the sensor 1 undergoes accurate temperature compensation over a wide temperature range from a low temperature to a high temperature, achieving a reliable operation with accuracy at high temperature.

30 Claims, 13 Drawing Sheets

SEMICONDUCTOR DEVICE HAVING A SENSOR WITH THE TEMPERATURE COMPENSATION FUNCTION

This application is a Continuation of PCT International Application No. PCT/JP99/06992 filed on Dec. 13, 1999, which was not published in English and which designated the United States, and on which priority is claimed under 35 U.S.C. §120, the entire contents of which are hereby incorporated by reference.

TECHNICAL FIELD

The present invention relates to a semiconductor device and particularly concerns an integrated circuit (hereinafter, referred to as an IC) having a function of temperature compensation to be used in combination with a variety of sensors, and a sensor IC combining a sensor with the IC having the temperature compensation function.

BACKGROUND ART

Conventionally, a sensor IC, which combines a sensor and an IC for processing a signal, has been used in a variety of fields. As a sensor IC with the function of turning on/off in response to an output signal of a sensor, a sensor IC for detecting magnetic fields has been particularly known. For example, a magnetic sensor IC is used for detecting rotation of a cooling fan for a CPU of a personal computer and so on.

Incidentally, in case of an IC which operates amplification on an output signal (electric signal) from the sensor and turns on/off the output at predetermined sensitivity, the output from the sensor normally changes with temperature. Thus, a temperature-compensating circuit is necessary for turning on/off the output of the IC at predetermined sensitivity all the time regardless of temperature. As temperature compensation, a conventional method has been known which changes an amplification degree of an output signal or voltage and current applied to the sensor according to a temperature characteristic of the output signal from the sensor.

For example, according to the invention disclosed in Japanese Patent Laid-Open No. 57-197883, temperature compensation is performed by applying to a sensor voltage increasing monotonously with temperature and driving the sensor by the voltage. However, some sensors require an extremely high voltage for driving, thereby increasing power consumption or heat generation. Consequently, the operation becomes unstable with temperature.

Further, the invention disclosed in Japanese Patent Publication No. 3-51118 has been known. The invention is provided with a Hall element (sensor) for generating Hall voltage, a reference voltage generating means for generating reference voltage relative to current passing through the Hall element, a comparing means for generating an output signal depending upon a relative magnitude of the Hall voltage and the reference voltage, and so on. Temperature compensation can be performed on a variety of sensors having sensitivity as a function of applied current.

As described above, the invention described in Japanese Patent Publication No. 3-51118 is applicable to a sensor where sensitivity is a function of applied current. However, the invention is not applicable to a sensor where sensitivity has no correlation to applied current. Moreover, the temperature-compensating circuit is not for general purpose use and cannot be combined with other sensors, resulting in narrow applicability.

Additionally, even in the case where a sensor is formed in the same manner, the same current is not always applied at the same sensitivity. Conversely, the same sensitivity is not always obtained at the same current. Therefore, in case of a large irregularity in characteristic of the sensor, monitoring current may be an adverse effect.

Incidentally, in the temperature-compensating circuit formed on widely used bulk silicon, leakage current rapidly increases on a PN-junction at a high temperature of 125° C. or above, causing a problem in temperature compensation. Temperature compensation is not possible particularly at a high temperature of 150° C. or above.

Meanwhile, as a technique for a high-temperature IC, a method has been known, which forms circuits on a semiconductor layer on an insulating base such as an SOI (silicon on insulator) substrate. It has been known that this method makes it possible to reduce an area of a PN-junction, reduce leakage current in a high temperature range, prevent a latch-up phenomenon, and permits an operation at a higher temperature. Hence, if the temperature-compensating circuit according to the conventional method is formed on the semiconductor layer on the SOI substrate, it is expected to somewhat improve the operation at a high temperature.

However, in the case where the temperature-compensating circuit of the conventional method is formed on the semiconductor layer on the SOI substrate, it is difficult to achieve accurate temperature compensation with reliability at a high temperature, and durability is deteriorated at a high temperature due to heat generated by power consumption.

In order to solve the above problem, it is necessary to accurately amplify a fine signal from the sensor and to perform accurate temperature compensation with a low driving voltage and small power consumption at a high temperature. However, it is not easy to realize a sensor IC meeting these conditions.

Hence, a sensor IC combining a sensor and an IC with temperature compensation, that accurately operates in a stable manner at a high temperature of 200° C. or above, has not been achieved yet. Also, the IC for temperature compensation for the sensor IC has not been achieved. Such a sensor IC has been demanded.

Further, as a detector for rotation of a gear wheel, a silicon-monolithic sensor IC using a CMOS circuit has been known. However, the highest temperature of the sensor IC is limited to 150° C. in practical use. It has been desirable to set the highest temperature at 200° C. or above.

The present invention is therefore devised against the above backdrop. The first object thereof is to provide a semiconductor device as an IC with temperature compensation (hereinafter, referred to as an IC for a sensor IC) that combination can be made with various sensors and can perform accurate temperature compensation on an output signal from the sensor with reliability at a high temperature.

The second object of the present invention is to provide a semiconductor device as a sensor IC (hereinafter, referred to as a sensor IC) that can accurately operate with reliability in a stable manner at a high temperature.

DISCLOSURE OF THE INVENTION

The present invention provides a semiconductor device (IC for a sensor IC) including amplifying means for inputting a sensor output signal from the sensor, amplifying the sensor output signal at a required temperature-independent amplification factor, and canceling an offset, reference signal producing means for producing a reference signal varying at a temperature coefficient equal to that of the sensor output signal from the sensor, comparing means which compares the magnitude of an amplification output signal from the amplifying means with that of the reference signal from the reference signal producing means and outputs a required signal according to a comparison result, and constant voltage generating means for generating temperature-independent constant voltage to be supplied to the sensor, characterized in that the amplifying means, the reference signal producing means, the comparing means, and the constant voltage generating means are formed using a semiconductor layer provided on an insulating substrate.

Here, the above "equal temperature coefficient" includes not only an equal temperature coefficient but also a substantially equal temperature coefficient. A permissible error value depends upon the accuracy of the semiconductor device (sensor IC).

As an embodiment of the IC for the sensor IC of the present invention, an IC for a sensor IC is applicable, in which the semiconductor layer is composed of a silicon thin film.

Further, as an embodiment of the IC for the sensor IC of the present invention, an IC for a sensor IC is applicable, in which the silicon thin film is 30 nm to 1000 nm in thickness.

As described above, according to the IC for the sensor IC, the amplifying means receives a sensor output signal, amplifies the sensor output signal at a required temperature-independent amplification factor, and operates to cancel an offset, thereby accurately amplifying the sensor output signal.

Furthermore, the reference signal producing means produces a reference signal varying at a temperature coefficient equal to that of the sensor output signal of the sensor. The signal is used as a reference signal, that of which the comparing means makes comparison with the magnitude of the amplification output signal of the amplifying means and outputs a required signal. Even when the output signal of the sensor is affected by temperature, the influence can be cancelled.

Additionally, the amplifying means, the reference signal producing means, the comparing means, and the constant voltage generating means are formed using the semiconductor layer provided on the insulating substrate, the semiconductor layer is preferably composed of a silicon thin film, and leakage current is reduced in a high temperature range and latch-up can be prevented.

For this reason, according to the IC for the sensor IC of the present invention, when one of the sensors changes the outputs at a temperature coefficient equal to that of the reference signal produced by the reference signal producing means, combination can be made with the sensor. In this case, accurate temperature compensation is performed for the output of the sensor over a wide temperature range from a low temperature to a high temperature (e.g., from −40° C. to 200° C. or above), achieving an accurate operation with reliability even at a high temperature.

Furthermore, in case of forming the sensor IC combined with the sensor, the IC for sensor IC of the present invention can be realized only by changing the components of the reference signal producing means according to a temperature characteristic of the sensor. Thus, combination can be made with a variety of sensors, achieving wide applicability.

As an embodiment of the IC for the sensor IC of the present invention, an IC for a sensor IC is applicable in which the reference signal producing means is based on the previous measurement of a temperature coefficient of the sensor output signal of the sensor and produces a reference signal having an equal temperature coefficient.

According to the embodiment, the reference signal producing means previously measures a temperature coefficient of the sensor output signal of the sensor and produces a reference signal having an equal temperature coefficient. The signal is used as a reference signal, that of which the comparing means makes comparison with the magnitude of the amplification output signal of the amplifying means and outputs a required signal. Thus, in case of forming the sensor IC with the combination of the sensor, accuracy of comparison is improved.

Further, the sensor can be severely selected for each characteristic upon manufacturing and assembling and the reference signal producing means can produce a reference signal according to the selected characteristic of the sensor. Thus, it is possible to readily realize a sensor IC having a desired specification by making combination with the sensor.

As an embodiment of the IC for the sensor IC of the present invention, an IC for the sensor IC is applicable in which the reference signal producing means has a temperature coefficient equal to that of the sensor output signal of the sensor and produces a reference signal changing linearly with absolute temperature.

According to the embodiment, the reference signal producing means has a temperature coefficient equal to that of the sensor output signal of the sensor and produces a reference signal changing linearly with absolute temperature. The signal is used as a reference signal, that of which the comparing means makes comparison with the magnitude of the amplification output signal of the amplifying means and outputs a required signal.

Therefore, in the embodiment, when one of the sensors has the output changing linearly with absolute temperature, a reference signal provided by a linear function of absolute temperature is produced according to the sensor, achieving the combination with the sensor. In this case, accurate temperature compensation is realized for the output of the sensor over a wide temperature range from a low temperature to a high temperature, achieving an accurate operation with reliability even at a high temperature. Moreover, even in a wide temperature range whose output is not a linear function but is approximate to a linear function, an accurate operation is possible.

As an embodiment of the IC for the sensor IC of the present invention, a sensor for a sensor IC is applicable in which the amplifying means includes a signal amplifying means which is composed of a plurality of operational amplifiers and amplifies the sensor output signal at a temperature-independent amplification factor and an offset compensating means for compensating for each offset of the plurality of the operational amplifiers every predetermined period.

As an embodiment of the IC for the sensor IC of the present invention, an IC for a sensor IC is applicable in which the operational amplifier includes a differential amplifying section for performing differential amplification on the sensor output signal and an offset compensating section for canceling an offset voltage of the differential amplifying section, the offset compensating section receives an offset compensating signal according to an offset voltage of the differential amplifying section every predetermined period and cancels the offset voltage of the differential amplifying section in response to the offset compensation signal.

As an embodiment of the IC for the sensor IC of the present invention, an IC for a sensor IC is applicable in which the offset compensation section further includes a capacitor for holding voltage to cancel the offset voltage of the differential amplifying section, the capacitor periodically holds a voltage according to the offset voltage of the differential amplifying section, and the offset compensating section cancels the offset voltage of the differential amplifying section according to the held voltage.

As an embodiment of the IC for the sensor IC of the present invention, an IC for a sensor IC is applicable in which the comparing means compares the magnitude of the amplification output signal from the amplifying means with the magnitudes of two reference voltages, and the output is turned on/off according to a comparison result.

As an embodiment of the IC for the sensor IC of the present invention, an IC for a sensor IC is applicable in which the comparing means computes a ratio of a reference voltage and the magnitude of the amplification output signal from the amplifying means and outputs a digital signal according to the ratio.

As an embodiment of the IC for the sensor IC of the present invention, an IC for a sensor IC is applicable in which the reference signal producing means includes at least a constant voltage source for generating temperature-independent constant voltage and a constant current source for generating constant current being directly proportional to absolute temperature and inversely proportional to the resistance of a reference resistor, and the reference signal producing means produces two reference voltages changing linearly with absolute temperature, by utilizing the constant voltage generated in the constant voltage source and the constant current generated in the constant current source.

As an embodiment of the IC for the sensor IC of the present invention, an IC for a sensor IC is applicable in which the reference signal producing means is constituted by a first constant current source for generating a constant current being directly proportional to absolute temperature and inversely proportional to the resistance of the reference resistor, a second constant current source which is connected in series to the first constant current source and applies temperature-independent constant voltage to a voltage/current converting resistor to generate constant current, a third constant current source for generating constant current being fixed times larger than a difference between a current of the second constant current source and a current of the first constant current source, and an upper limit reference voltage generating resistor and a lower limit reference voltage generating resistor which are connected in series to the third constant current source and are applied constant current from the third constant current source, and one or both of potentials generated in the upper limit reference voltage generating resistor and the lower limit reference voltage generating resistor are taken out as reference potentials.

As an embodiment of the IC for the sensor IC of the present invention, an IC for a sensor IC is applicable in which the reference resistor, the voltage/current converting resistor, the upper limit reference voltage generating resistor, and the lower limit reference voltage generating resistor are equal to one another in temperature coefficient.

Meanwhile, the present invention provides a semiconductor device (sensor IC) including a sensor for converting a measured physical quantity to an electric signal and outputting the signal, the outputted signal having a peculiar temperature coefficient, an amplifying means which inputs a sensor output signal of the sensor, amplifies the sensor output signal at a required amplification factor of temperature independence, and cancels an offset, a reference signal producing means for producing a reference signal varying at a temperature coefficient equal to that of the sensor output signal of the sensor, a comparing means for comparing the magnitude of the amplification output signal from the amplifying means with the magnitude of the reference signal from the reference signal producing means and for outputting a required signal according to a comparison result, and a constant voltage generating means for generating temperature-independent constant voltage to be supplied to the sensor, characterized in that the amplifying means, the reference signal producing means, the comparing means, and the constant voltage generating means are formed using a semiconductor layer provided on an insulating substrate.

As an embodiment of the sensor IC of the present invention, an sensor IC is applicable in which the semiconductor layer is composed of a silicon thin film.

Additionally, as an embodiment of the sensor IC of the present invention, an sensor IC is applicable in which the silicon thin film is 30 nm to 1000 nm in thickness.

As described above, according to the sensor IC of the present invention, the amplifying means inputs a sensor output signal of the sensor, amplifies the sensor output signal at a required amplification factor of temperature independence, and cancels an offset, thereby accurately amplifying the output signal of the sensor.

Further, the reference signal producing means produces a reference signal changing at a temperature coefficient equal to that of the sensor output signal of the sensor. The signal is used as a reference signal, that of which the comparing means makes comparison with the magnitude of the amplification output signal of the amplifying means and outputs a required signal. Hence, even when the output signal of the sensor is changed due to the influence of temperature, the influence can be cancelled.

Moreover, the amplifying means, the reference signal producing means, the comparing means, and the constant voltage producing means are formed by using a semiconductor layer provided on an insulating substrate. The semiconductor layer is preferably composed of a silicon thin film, and leakage current can be reduced in a high temperature range and latch-up can be prevented.

For this reason, according to the sensor IC of the present invention, over a wide temperature range from a low temperature to a high temperature (e.g., from $-40°$ C. to $200°$ C. or above), temperature compensation can be performed accurately for the output of the sensor, achieving an accurate operation with reliability even at a high temperature.

As mentioned above, according to the sensor IC of the present invention, the reference signal producing means produces a reference signal changing at a temperature coefficient equal to that of the sensor output signal of the sensor. The signal is used as a reference signal, that of which the comparing means makes comparison with the magnitude of the amplification output signal of the amplifying means and outputs a required signal. Furthermore, the amplifying means amplifies the sensor output signal from the sensor at a required amplification factor of temperature independence and cancels an offset. Hence, the sensor IC of the present invention can perform accurate temperature compensation on the output of the sensor over a wide temperature range from a low temperature and a high temperature, thereby achieving an accurate operation with reliability even at a high temperature.

As an embodiment of the sensor IC of the present invention, an sensor IC is applicable in which a sensor output signal has a peculiar temperature coefficient in the sensor and the sensor output signal is produced in a linear function of absolute temperature.

As an embodiment of the sensor IC of the present invention, a sensor IC is applicable in which the sensor is a magnetic sensor.

As an embodiment of the sensor IC of the present invention, a sensor IC is applicable in which the magnetic sensor is a Hall element.

As an embodiment of the sensor IC of the present invention, a sensor IC is applicable in which the Hall element has a magnetic sensitive part made of GaAs.

The invention of the embodiment is completed by the inventor et al. who considered a characteristic of GaAs having a resistance increasing with temperature and earnestly studied the characteristic for positive and effective use.

Therefore, in the present invention, GaAs is adopted for the magnetic sensitive part of the Hall element. A resistance of GaAs increases with temperature. Thus, it is possible to reduce current of the magnetic sensitive part and to reduce source current with temperature. Hence, the sensor IC decreases in power consumption at a higher temperature and it is possible to suppress an increase in temperature caused by consumption of current, thereby operating in a stable manner even at a high temperature.

As an embodiment of the sensor IC of the present invention, a sensor IC is applicable in which the reference signal producing means previously measures a temperature coefficient of the sensor output signal of the sensor and produces a reference signal having an equal temperature coefficient.

According to the embodiment, the reference signal producing means previously measures a temperature coefficient of the sensor output signal of the sensor and produces a reference signal having an equal temperature coefficient. The signal is used as a reference, that of which the comparing means makes comparison with the magnitude of the amplification output signal of the amplifying means and outputs a required signal. Consequently, accuracy of comparison is improved.

Also, the sensor can be severely selected for each characteristic in manufacturing and assembling and the reference signal producing means can produce a reference signal according to the selected characteristic of the sensor. Thus, it is possible to readily realize a sensor IC having a desired specification by making combination with the sensor.

As an embodiment of the sensor IC of the present invention, a sensor IC is applicable in which the reference signal producing means produces a reference signal having a temperature coefficient equal to that of the sensor output signal and changing linearly with absolute temperature.

According to the embodiment, the reference signal producing means produces a reference signal having a temperature coefficient equal to that of the sensor output signal of the sensor and changing linearly with absolute temperature. The signal is used as a reference signal, that of which the comparing means makes comparison with the magnitude of the amplification output signal of the amplifying means and outputs a required signal. Thus, even when the output signal of the sensor is changed due to the influence of temperature, the influence can be cancelled.

For this reason, accurate temperature compensation is possible for the output of the sensor over a wide temperature range from a low temperature to a high temperature, achieving an accurate operation with reliability even at a high temperature. Further, even in a wide temperature range whose output is not a linear function but is close to a linear function in some temperature range, an accurate operation can be realized in that temperature range.

As an embodiment of the sensor IC of the present invention, a sensor IC is applicable in which the amplifying means is composed of a plurality of operational amplifiers and includes a signal amplifying means for amplifying the sensor output signal at a temperature-independent amplification factor and an offset compensating means for compensating for each offset of the plurality of the operational amplifiers every predetermined period.

As an embodiment of the sensor IC of the present invention, a sensor IC is applicable in which the operational amplifier includes a differential amplifying section for performing differential amplification on the sensor output signal and an offset compensating section for canceling an offset voltage of the differential amplifying section, the offset compensating section receives an offset compensating signal according to an offset voltage of the differential amplifying section every predetermined period, and the offset voltage of the differential amplifying section is cancelled in response to the offset compensation signal.

As an embodiment of the sensor IC of the present invention, a sensor IC is applicable in which the offset compensation section further includes a capacitor for holding voltage for canceling the offset voltage of the differential amplifying section, the capacitor periodically holds a voltage according to the offset voltage of the differential amplifying section, an the offset compensating section cancels the offset voltage of the differential amplifying section according to the held voltage.

As an embodiment of the sensor IC of the present invention, a sensor IC is applicable in which the comparing means compares the magnitude of the amplification output signal from the amplifying means with the magnitudes of two reference voltages, and the output is turned on/off according to a comparison result.

As an embodiment of the sensor IC of the present invention, a sensor IC is applicable in which the comparing means computes a ratio of a reference voltage and the magnitude of the amplification output signal from the amplifying means and outputs a digital signal according to the ratio.

As an embodiment of the sensor IC of the present invention, a sensor IC is applicable in which the reference signal producing means includes at least a constant voltage source for generating temperature-independent constant voltage and a constant current source for generating constant current being directly proportional to absolute temperature and inversely proportional to the resistance of a reference resistor, and the reference signal producing means produces two reference voltages changing linearly with absolute temperature, by utilizing to the constant voltage generated in the constant voltage source and the constant current generated in the constant current source.

As an embodiment of the sensor IC of the present invention, a sensor IC is applicable in which the reference signal producing means is constituted by a first constant current source for generating a constant current being directly proportional to absolute temperature and inversely proportional to the magnitude of the reference resistor, a second constant current source being connected in series to the first constant current source and applying temperature-independent constant voltage to a voltage/current converting resistor to generate constant current, a third constant current source for generating constant current being constant-times larger than a difference between a current of the second constant current source and a current of the first constant current source, and an upper limit reference voltage generating resistor and a lower limit reference voltage generating resistor being connected in series to the third constant current source and being applied constant current from the third constant current source, and one or both of potentials generated in the upper limit reference voltage generating resistor and the lower limit reference voltage generating resistor are taken out as reference potentials.

As an embodiment of the sensor IC of the present invention, a sensor IC is applicable in which the reference resistor, the voltage/current converting resistor, the upper limit reference voltage generating resistor, and the lower limit reference voltage generating resistor are equal to one another in temperature coefficient.

BEST MODE FOR CARRYING OUT THE INVENTION

Figure 1:
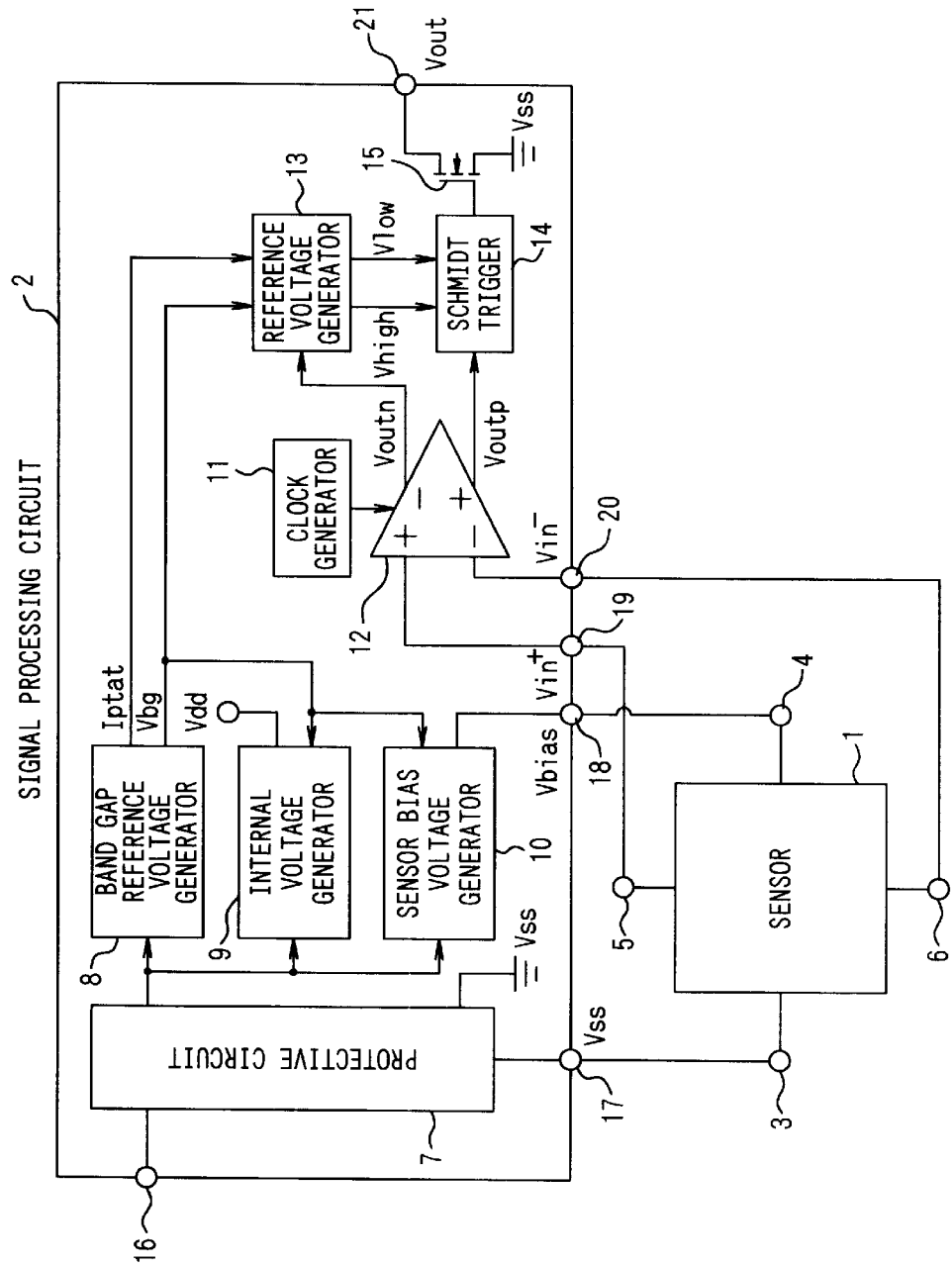
FIG. 1 is a block diagram showing the configuration of a signal processing circuit together with a sensor. The signal processing circuit is provided in a semiconductor device (IC for a sensor IC) of the present invention.

Referring to figures, the following will describe preferred embodiments of the present invention. FIG. 1 is a block diagram showing the configuration of a signal processing circuit disposed in a sensor IC of a semiconductor device of the present invention together with a sensor.

As shown in FIG. 1, the sensor IC is constituted by a sensor 1, which converts a physical quantity to an electric signal and outputs the signal, and an integrated signal processing circuit 2, which processes an output signal of the sensor 1. The following will describe that the sensor 1 and the signal processing circuit 2 are combined in a hybrid manner. Here, the sensor IC may be realized by a monolithic IC as well.

As shown in FIG. 1, the sensor 1 is provided with a ground terminal 3, a bias terminal 4, and output terminals 5 and 6. Types of the sensor 1 is not particularly limited and includes a magnetic sensor, a pressure sensor, an optical sensor, a temperature sensor, a humidity sensor, a position sensor, a speed sensor, an rpm sensor, and so on. However, it is preferable to adopt a sensor capable of indicating an output in an ideal manner or closely analogous to a linear function of temperature when it is applied a fixed voltage of temperature-independence. For example, a Hall element (Hall sensor), which is one of magnetic sensors, is applicable, and it is particularly preferable that a magnetic sensitive part thereof is made of GaAs (gallium arsenide).

Many sensors monotonously increase and decrease outputs within a range of an operating temperature and indicate a temperature change as a linear function of temperature in an approximate or ideal manner. Especially by selecting a range of an operating temperature, outputs of many sensors can be approximate to a linear function of temperature, so that many sensors can be used as the sensor 1.

Here, the output of the sensor 1 changes linearly with absolute temperature. This change includes constant output making no changes as well as output increasing or decreasing linearly with absolute temperature.

Referring to FIG. 1, the following will discuss the configuration of the signal processing circuit 2.

As shown in FIG. 1, the signal processing circuit 2 is provided with at least a protective circuit 7, a band gap reference voltage generator 8, an internal voltage generator 9, a sensor bias voltage generator 10 constituting a constant-voltage generating means for the sensor 1, a clock generator 11, a sensor signal amplifier 12 constituting an amplifier, a reference voltage generator 13 constituting a reference signal generator, a Schmidt trigger 14 constituting a comparing means 14, and an NMOSFET 15.

Regarding the protective circuit 7, power source connects a power source connecting terminal 16 and a ground terminal 17. This connection applies source voltage across the terminals. In the case where power source is connected inversely when the above connection is made, protection against backward voltage is provided on the band gap reference voltage generator 8, the internal voltage generator 9, and the sensor bias voltage generator 10 that are connected on the output side.

The band gap reference voltage generator 8 generates reference voltage supplied to the internal voltage generator 9, the sensor bias voltage generator 10, and the reference voltage generator 13, and also generates constant current supplied to the reference voltage generator 13.

The internal voltage generator 9 generates voltage Vdd for driving each section of the signal processing circuit 2, and the generated voltage Vdd (not shown) is supplied to the sensor signal amplifier 12, the reference voltage generator 13, and so on.

The sensor bias voltage generator 10 generates constant voltage of temperature-independence, that is supplied to the sensor 1, as bias voltage. The generated bias voltage Vbias is applied between the ground terminal 3 and the bias terminal 4 of the sensor 1, so that the sensor 1 is operated.

Figure 2:
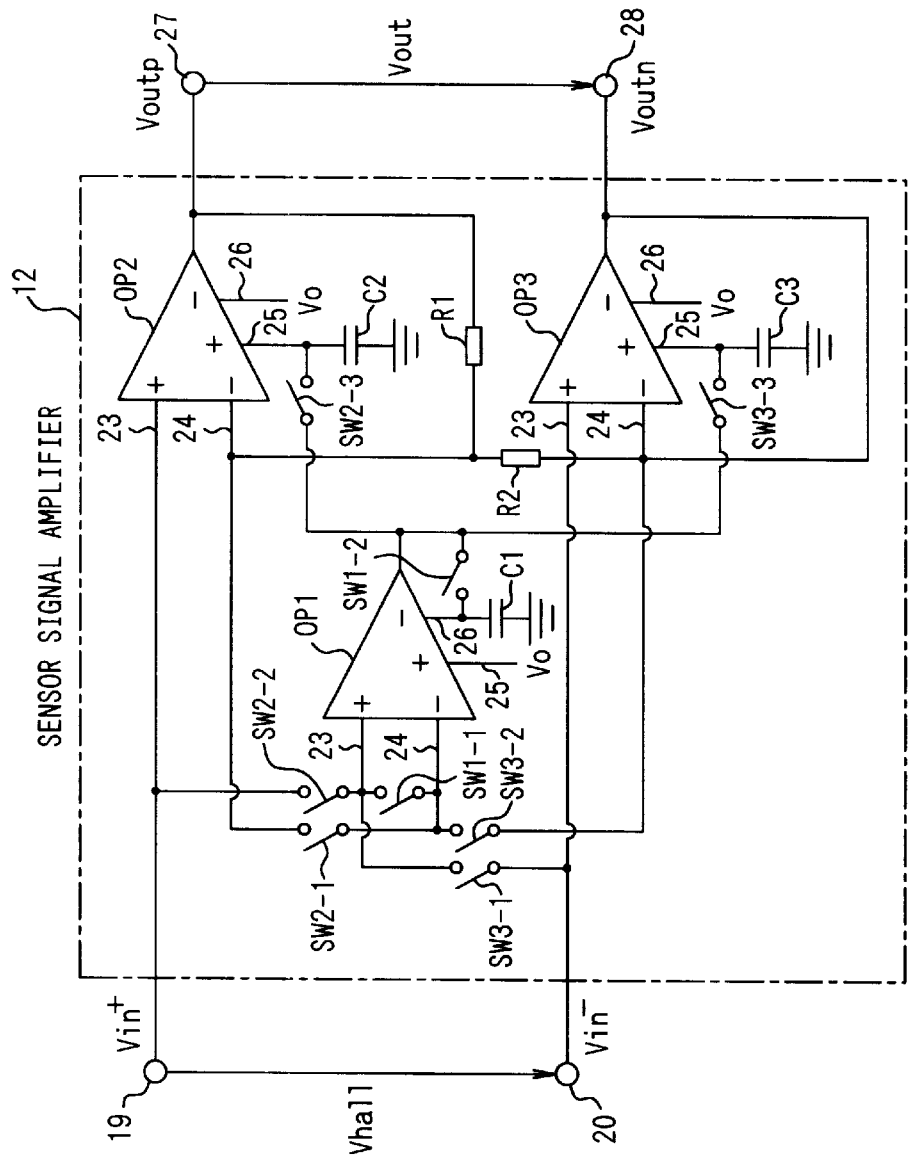
FIG. 2 is a circuit diagram showing an example of the configuration of a sensor signal amplifier.

The clock generator 11 generates a clock for opening and closing switches SW1-1 to SW1-2, switches SW2-1 to SW2-3, and switches SW3-1 to SW3-3, that are disposed as illustrated in FIG. 2, to cancel offset of operational amplifiers OP1 to OP3 constituting the sensor signal amplifier 12.

The sensor signal amplifier 12 has the functions of inputting output signals from the sensor 1 to two input terminals via sensor input terminals 19 and 20, performing amplification with amplification factor (gain) of temperature-independence, and canceling offset. Also, output Voutp of the sensor signal amplifier 12 is supplied to the Schmidt trigger 14, and output Voutn thereof is supplied to the input terminal of an operational amplifier OP5 of the reference voltage generator 13.

The reference voltage generator 13 generates two different upper limit reference voltage Vhigh and lower limit reference voltage Vlow that are used when the Schmidt trigger 14 compares the output voltages of the sensor signal amplifier 12, and the upper limit reference voltage Vhigh and the lower limit reference voltage Vlow are each supplied to the Schmidt trigger 14. Further, the reference voltage generator 13 generates two reference voltages Vhigh and Vlow whose output changes with a temperature coefficient equal to that of the output of the sensor 1 and whose magnitude changes linearly with absolute temperature. The meaning of a temperature coefficient will be discussed later.

Here, the reference voltages change linearly with absolute temperature. This includes remaining constant making no change as well as increasing or decreasing linearly with absolute temperature.

The NMOSFET 15 is connected to the output of the Schmidt trigger 14, and the drain of the NMOSFET 15 is connected to an output terminal 21. Moreover, the Schmidt trigger 14 compares output voltage of the sensor signal amplifier 12 with the upper limit reference voltage Vhigh and the lower limit reference voltage Vlow from the reference voltage generator 13. In the case where the output voltage is higher than the upper limit reference voltage Vhigh, output Vout is set at "L" level, and in the case where the output voltage is lower than the lower limit reference voltage Vlow, the output Vout is set at "H" level. Additionally, since the Schmidt trigger 14 acts as a comparator having hysteresis, a dead band appears between the upper limit reference voltage Vhigh and the lower limit reference voltage Vlow and the output Vout is not inverted.

The signal processing circuit 2 configured as above is formed in an IC (integrated circuit). The following will discuss the formation thereof.

The process of integrating the signal processing circuit 2 includes a C-MOS process and a bipolar process and is not particularly limited. Further, as for a semiconductor substrate constituting the IC, a semiconductor layer on an insulating base, i.e., a semiconductor layer provided on an insulating substrate is used. In this case, leakage current is small at a high temperature, latch-up is not likely to occur, accuracy can be improved on an element such as a capacitor, and a circuit function for reducing offset voltage of the sensor signal amplifier 12 can be obtained even in a high temperature range like at room temperature.

Particularly, an SOI (Silicon On Insulator) substrate is a proven material, and it is more preferable to form a circuit on the SOI substrate (silicon thin film formed on an insulating substrate). As for the insulating base (insulating substrate) used in the SOI structure, sapphire, $\gamma$-$Al_2O_3$, fluoride, silicon oxide are available. Other materials are applicable as long as the same insulation is presented.

Furthermore, a manufacturing method thereof is not particularly limited. For example, in the case where the insulating base is made of silicon oxide, any one of a SIMOX (separation by ion implanted oxide) substrate, a bonded SOI substrate, and a solid epitaxial growth SOI substrate is applicable.

Here, it is preferable to set a thickness of the silicon thin film (silicon layer) at 30 nm to 1000 nm. The silicon thin film is a semiconductor layer provided on the insulating substrate with the signal processing circuit 2 formed thereon. When the thickness is smaller than 30 nm, a problem occurs in the operation of the device due to the influence of a defect around an interface between the silicon layer and the insulating layer. Meanwhile, when the thickness is larger than 1000 nm, an area of a PN-junction increases, leakage current reaches the same level as a bulk silicon substrate. Thus, it is difficult to operate the device at a high temperature of 150° C. or above. Therefore, it is more preferable to set a thickness of the silicon thin film at 50 nm to 200 nm. In the example of the present invention (described later), a silicon thin film with a thickness of 120 nm is used.

Referring to FIG. 2, the following will discuss the detail of the configuration of the sensor signal amplifier 12.

As shown in FIG. 2, the sensor signal amplifier 12 is constituted by operational amplifiers OP1 to OP3. The operational amplifiers OP1 to OP3 are each provided with a non-inverting input terminal 25 and an inverting input terminal 26 for offset compensation in addition to a non-inverting input terminal 23 and an inverting input terminal 24 for amplifying a sensor signal.

The sensor signal amplifier 12 is provided with two input terminals 19 and 20 for inputting an output signal from the sensor 1. An input terminal 19 is connected to the non-inverting input terminal 23 of the operational amplifier OP1 via the switch SW2-2 and is directly connected to the non-inverting input terminal 23 of the operational amplifier OP2. Also, the other input terminal 20 is connected to the non-inverting input terminal 23 of the operational amplifier OP1 via the switch SW3-1 and is directly connected to the non-inverting input terminal 23 of the operational amplifier OP3.

The switch SW1-1 connects the non-inverting input terminal 23 and the inverting input terminal 24 of the operational amplifier OP1. Further, the inverting input terminal 24 of the operational amplifier OP1 is connected to the inverting input terminal 24 of the operational amplifier OP2 via the switch SW2-1 and is connected to the inverting input terminal 24 of the operational amplifier OP3 via the switch SW3-2. The switch SW1-2 connects the output terminal and the inverting input terminal 26 of the operational amplifier OP1, and the inverting input terminal 26 is grounded via a capacitor C1.

The output terminal of the operational amplifier OP1 is connected to the non-inverting input terminal 25 of the operational amplifier OP2 via the switch SW2-3, and the non-inverting input terminal 25 is grounded via a capacitor C2. Moreover, the output terminal of the operational amplifier OP1 is connected to the non-inverting input terminal 25 of the operational amplifier OP3 via the switch SW3-3, and the non-inverting input terminal 25 is grounded via a capacitor C3.

A resistor R1 connects the inverting input terminal 24 and the output terminal of the operational amplifier OP2. The output of the operational amplifier OP2 is taken out from an output terminal 27. Further, a resistor R2 connects the inverting input terminal 24 of the operational amplifier OP2 and the inverting input terminal 24 of the operational amplifier OP3. Additionally, the output of the operational amplifier OP3 is fed back to the inverting input terminal 24, and the output is taken out from an output terminal 28. Furthermore, reference potential Vo is equally applied to the non-inverting input terminal 25 of the operational amplifier OP1, and the inverting input terminal 26 of the operational amplifiers OP2 and OP3.

Moreover, the above switches SW1-1 and SW1-2, switches SW2-1 to SW2-3, and switches SW3-1 to SW3-3 carry out an open/close operation at predetermined period based on a clock from the clock generator 11, which is illustrated in FIG. 1.

Figure 3:
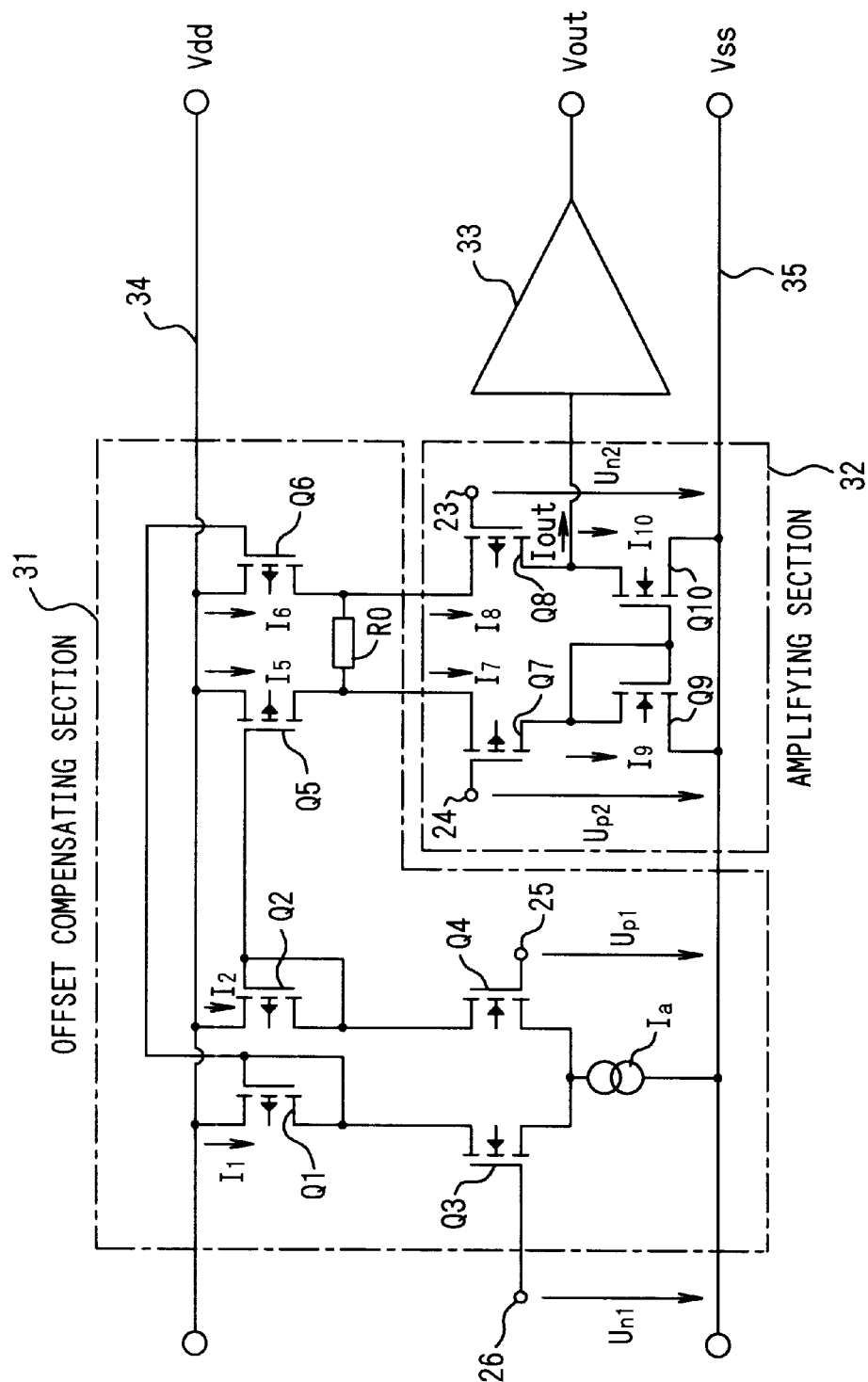
FIG. 3 is a circuit diagram showing an example of the configuration of an operational amplifier, which constitutes the sensor signal amplifier of FIG. 2.

The operational amplifiers OP1 to OP3 of the sensor signal amplifier 12 configured as above each have a configuration illustrated in FIG. 3. The configuration of the operational amplifier will be described.

As shown in FIG. 3, the operational amplifier is constituted by an offset compensating section 31, an amplifying section 32, and a secondary amplifying section 33.

As shown in FIG. 3, the offset compensating section 31 is composed of PMOSFET (hereinafter, referred to as a PMOS transistor) Q1 and Q6 constituting a current mirror circuit, PMOS transistors Q2 and Q5 constituting a current mirror circuit, a resistor R0 for offset compensation that connects the drains of the PMOS transistors Q5 and Q6, NMOSFET (hereinafter, referred to as NMOS transistors) Q3 & Q4 that input an offset compensating signal and control source-drain current of the MOS transistors Q1, Q2, Q5, and Q6, and a current source Ia.

To be specific, the source of the PMOS transistor Q1 is connected to a positive-side source line 34, the gate and the drain thereof are connected to each other, and the common connecting part is connected to the drain of the NMOS transistor Q3 and the gate of the PMOS transistor Q6. Further, the source of the PMOS transistor Q2 is connected to the positive-side source line 34, the gate and the drain thereof are connected to each other, and the common connecting part is connected to the drain of the NMOS transistor Q4 and the gate of the PMOS transistor Q5.

The sources of the PMOS transistors Q5 and Q6 are connected to the positive-side source line 34, and the resistor R0 for temperature compensation connects the drains thereof. The gate of the NMOS transistor Q3 is connected to the input terminal 26, and the gate of the NMOS transistor Q4 is connected to the input terminal 25. Moreover, the sources of the NMOS transistors Q3 and Q4 are connected to each other, and the common connecting part is connected to a negative-side source line 35 via a constant current source Ia.

As shown in FIG. 3, the amplifying section 32 is composed of PMOS transistors Q7 and Q8 for inputting a signal and NMOS transistors Q9 and Q10 constituting a current mirror circuit.

To be specific, the drain of the PMOS transistor Q5 is connected to the source of the PMOS transistor Q7. The gate of the PMOS transistor Q7 is connected to the input terminal 24, and the drain thereof is connected to the drain of the NMOS transistor Q9. Additionally, the gate and the drain of the NMOS transistor Q9 are connected to each other, and the source thereof is connected to the negative-side source line 35.

Also, the drain of the PMOS transistor Q6 is connected to the source of the PMOS transistor Q8. Further, the gate of the PMOS transistor Q8 is connected to the input terminal 23, and the drain thereof is connected to the drain of the NMOS transistor Q10 and the input of the secondary amplifying section 33. Furthermore, the gate of the NMOS transistor Q10 is connected to the gate of the NMOS transistor 9, and the source thereof is connected to the negative-side source line 35.

Referring to FIGS. 2 and 3, the following will describe the operation of the sensor signal amplifier 12 configured as above.

First, the compensating operation (canceling operation) will be discussed regarding each offset in the operational amplifiers OP1 to OP3.

While clock Ø1 from the clock generator 11, which is shown in FIG. 1, is turned on, only the switches SW1-1 and SW1-2 shown in FIG. 2 are closed simultaneously, the non-inverting input terminal 23 and the inverting input terminal 24 of the operational amplifier OP1 are connected to each other, and the input terminals are short-circuited. For this reason, offset voltage outputted from the operational amplifier OP1 is held in the capacitor C1, and the held voltage is supplied to the inverting input terminal 26 of the offset compensating section 31, which is shown in FIG. 3.

Incidentally, in the amplifying section 32 of FIG. 3, input voltage to be amplified is applied from the gate of a differential pair of the PMOS transistors Q7 and Q8. A threshold voltage for operating the PMOS transistors Q7 and Q8 is varied due to mismatch of the PMOS transistors Q7 and Q8, causing input offset voltage.

Here, currents $I_1$, $I_2$, $I_5$, $I_6$, $I_7$, $I_8$, $I_9$, and $I_{10}$ each flow between the drain and source of the MOS transistors Q1, Q2, Q5, Q6, Q7, Q8, Q9, and Q10, inputs voltages $U_{n1}$ and $U_{p1}$ are applied between the negative-side source line 35 and the gates of the MOS transistors Q3 and Q4, input voltages $U_{p2}$ and $U_{n2}$ are applied between the negative source line 35 and the gates of the MOS transistors Q7 and Q8, and current $I_{out}$ flows from the drain of the MOS transistor Q8 to the secondary amplifying section 33. In this case, the MOS transistors Q1 and Q6 and the MOS transistors Q2 and Q5 respectively form current mirror circuits. Hence, according to the relationship of the current mirrors, the following equations (1) and (2) are held.

$$I_5 = h \times I_2 \tag{1}$$

$$I_6 = h \times I_1 \tag{2}$$

Here, h is a constant and both are equal in mirror ratio.

Additionally, the current Ia flowing through the constant current source Ia is a constant current. Thus, the following equation (3) is held.

$$Ia = I_1 + I_2 \tag{3}$$

Furthermore, the MOS transistor Q9 and Q10 form the current mirror circuit. Thus, the following equation (4) is held.

$$I_9 = I_{10} \tag{4}$$

Here, an offset voltage, which is obtained when the inputs of the MOS transistors Q7 and Q8 are set at 0, is held in the capacitor C1 as described above, and the held voltage is applied to the gate of the MOS transistor Q4 of the offset compensating section 31.

Therefore, a ratio of currents flowing through the MOS transistors Q3 and Q4 of the offset compensating section 31, that is, a ratio of the current $I_1$ and current $I_2$ changes, and the currents $I_5$ and $I_6$ change accordingly.

Here, assuming that the transistors Q3 and Q4 have a transconductance of g1, the following equation (5) is held.

$$I_2 - I_1 = g1 \times (U_{p1} - U_{n1}) \tag{5}$$

Further, since the current $I_{out}$ and the current $I_8$ have the relationship of $I_{out} \ll I_8$, the following equation (6) is held.

$$I_9 = I_{10} = I_7 \approx I_8 \tag{6}$$

At this moment, the following equation (7) is held regarding the current $I_R$ flowing through the resistor R0.

$$I_R = I_5 - I_7 = I_8 - I_6 \tag{7}$$

Also, the following equation (8) is held according to the equations (6) and (7).

$$I_R = (I_5 - I_6)/2 \tag{8}$$

Further, the following equation (9) is held according to the equations (1), (2), and (5).

$$I_R = h \times (I_2 - I_1)/2 = g1 \times h \times (U_{p1} \times U_{n1})/2 \tag{9}$$

Moreover, when the transistors Q7 and Q8 have a transconductance of g and g/{1+(g×R0/2)} is defined as g2, the output $V_{out}$ is expressed by the following equation (10) with k serving as a constant.

$$V_{out} = k \times I_{out} = k \times (I_8 - I_7) = k \times g2 \times (U_{p2} - U_{n2} - I_R \times R0) = k \times g2 \times \{U_{p2} - U_{n2} - R0 \times g1 \times h \times (U_{p1} - U_{n1})/2\} \tag{10}$$

According to the equation (10), an offset voltage, which is caused by the mismatch of the transistors Q7 and Q8, is expressed by a difference between a voltage $U_{p2}$ and a voltage $U_{n2}$. Thus, the inputs of the transistors Q3 and Q4, i.e., a voltage ($U_{p1} - U_{n1}$) is inputted as a suitable value so as to cancel the offset voltage.

Next, while a clock Ø2 from the clock generator 11 is turned on, only the switches SW3-1 to SW3-3 are closed simultaneously. Thus, an offset voltage which is concerned with the operational amplifier OP3 is outputted from the operational amplifier OP1 and is held in the capacitor C3, and the held voltage is supplied to the non-inverting input terminal 25 of the offset compensating section 31, which is illustrated in FIG. 3. As a result, the offset voltage of the operational amplifier OP3 is cancelled according to the foregoing principle.

Subsequently, while a clock Ø3 from the clock generator 11 is turned on, only the switches SW2-1 to SW2-3 are closed simultaneously. Hence, an offset voltage which is concerned with to the operational amplifier OP2 is outputted from the operational amplifier OP1 and is held in the capacitor C2, and the held voltage is supplied to the non-inverting input terminal 25 of the offset compensating section 31, which is illustrated in FIG. 3. As a result, the offset voltage of the operational amplifier OP2 is cancelled according to the foregoing principle.

Meanwhile, while performing the offset compensating operations of the operational amplifiers OP1 to OP3, a sensor signal voltage Vhall, which is applied to the sensor signal input terminals 19 and 20 from the sensor 1, is amplified by the operational amplifiers OP1 and OP2. The amplified voltage is outputted from the output terminals 27 and 28.

Further, in the case where the foregoing operation can completely cancel the offset voltages of the operational amplifiers OP1 to OP3, assuming that a sensor signal voltage is Vhall applied to the sensor signal input terminals 19 and 20 from the sensor 1, an output voltage Vout outputted to the output terminals 27 and 28 of the sensor signal amplifier 12 is expressed by the following equation (11)

$$V_{out} = \{(R1/R2) + 1\} \cdot Vhall \tag{11}$$

Here, R1 represents a resistance of a resistor connecting between the inverting input terminal 24 and the output terminal of the operational amplifier OP2, a resistor R2 represents a resistance of a resistor connecting between the inverting input terminal 24 of the operational amplifier OP2 and the inverting input terminal 24 of the operational amplifier OP3 (see FIG. 2).

According to the equation (11), the sensor signal amplifier circuit 12 can amplify a sensor signal with a necessary amplification degree, which is temperature-independent, if the resistances of R1 and R2 are equal in temperature coefficient.

Figure 4:
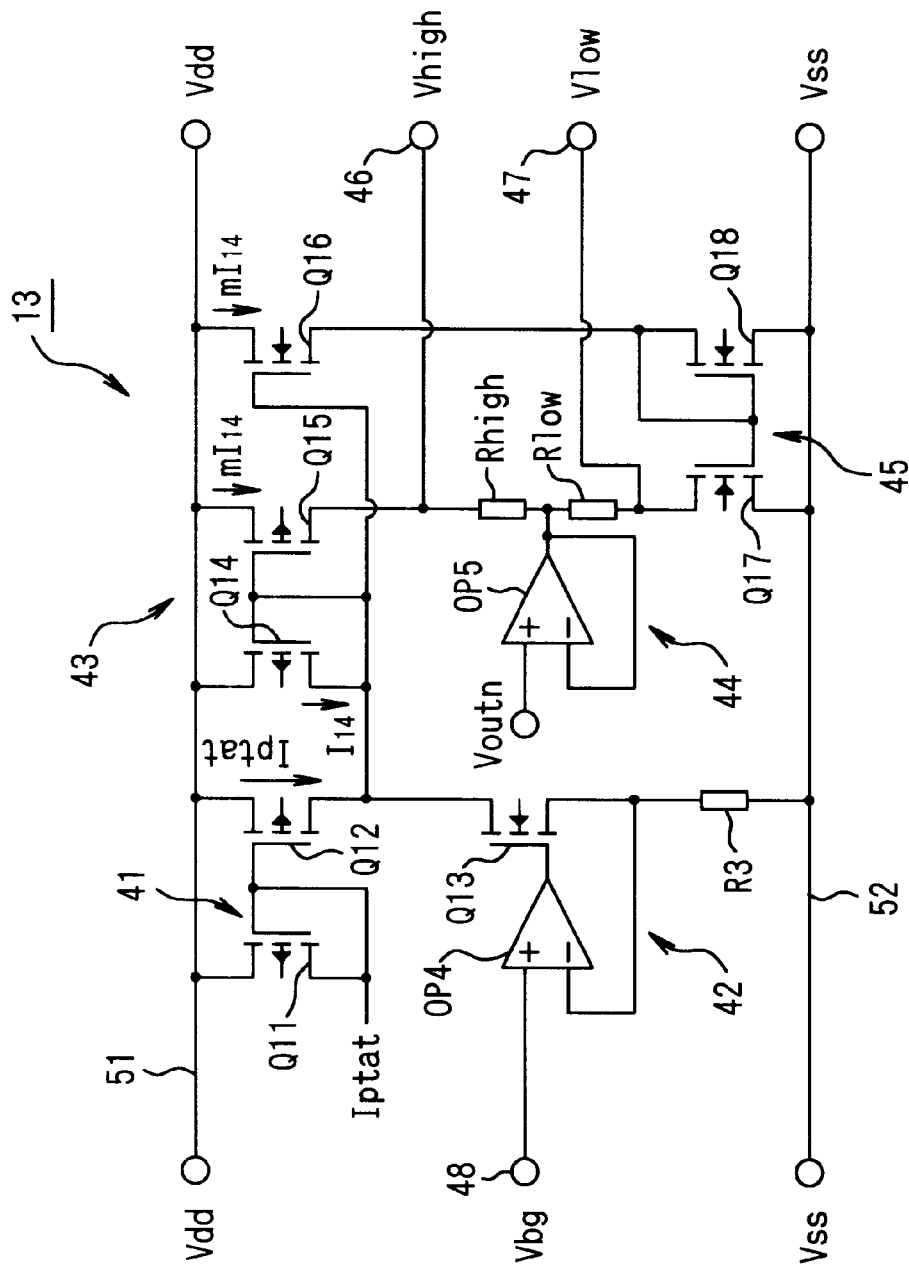
FIG. 4 is a circuit diagram showing an example of the configuration of a reference voltage generator.

Referring to FIG. 4, the following will discuss the detail of the configuration of the reference voltage generator 13, which is illustrated in FIG. 1.

As shown in FIG. 4, the reference voltage generator 13 is provided with a current mirror circuit 41, which is composed of PMOS transistors Q11 and Q12 and functions as a constant current source, a constant current circuit 42, which supplies a constant current by applying a temperature-independent voltage Vbg to a voltage-current converting resistor R3, a current mirror circuit 43, which is composed of PMOS transistors Q14, Q15, and Q16 and functions as a constant current source, a reference voltage generator 44, which is composed of an upper limit reference voltage generating resistor Rhigh, a lower reference voltage generating resistor Rlow, and so on, and a current mirror circuit 45, which is composed of NMOS transistors Q17 and Q18. An upper limit reference voltage Vhigh and a lower limit reference voltage Vlow are outputted from output terminals 46 and 47 and are supplied to the Schmidt trigger 14 illustrated in FIG. 1.

As shown in FIG. 4, the current mirror circuit 41 is composed of the PMOS transistors Q11 and Q12, the gates thereof connect to each other, and the common connecting part connects to the drain of the PMOS transistor Q11. Further, the sources of the PMOS transistors Q11 and Q12 are connected to a positive-side source line 51. Additionally, the drain of the PMOS transistor Q12 connects to the drain of the NMOS transistor Q13.

A current Iptat generated in the band gap reference voltage generator 8 is supplied to the PMOS transistor Q11 of the current mirror circuit 41 configured as above, and the current Iptat flows through the MOS transistor Q12 as a constant current. The current Iptat is directly proportional to absolute temperature T and inversely proportional to a resistor R4 (not shown) disposed in the band gap reference circuit 8. Assuming that K is a constant, the Iptat is represented by the following equation.

$$Iptat = K \cdot (T/R4) \tag{12}$$

As shown in FIG. 4, the constant current circuit 42 is constituted of the NMOS transistor Q13, the voltage-current converting resistor R3, and the operational amplifier OP4. Namely, the drain of the NMOS transistor Q13 connects to the drain of the MOS transistor Q12, the source thereof connects to the terminal of the voltage-current converting resistor R3, and the other terminal connects to the negative-side source line 52. Moreover, the regarding operational amplifier OP4, the temperature-independent constant voltage Vbg is applied to the non-inverting input terminal from the band gap reference circuit 8 via the input terminal 48, the output terminal of the operational amplifier OP4 connects to the gate of the NMOS transistor Q13, and the inverting input terminal thereof connects to the common connecting part between the source of the NMOS transistor Q13 and the voltage-current converting resistor R3.

As shown in FIG. 4, the current mirror circuit 43 is constituted of the MOS transistors Q14, Q15, and Q16. Namely, the gates of the MOS transistors Q14, Q15, and Q16 connect to one another, and the common connecting part connects to the drain of the MOS transistor Q14 and the common connecting part between the drains of the MOS transistors Q12 and the MOS transistor Q13. Further, the sources of the MOS transistors Q14, Q15, and Q16 connect to the positive-side source line 51. Moreover, the drain of the MOS transistor Q15 connects to the terminal of the upper limit reference voltage generating resistor Rhigh, and the drain of the MOS transistor Q16 connects to the drain of the MOS transistor Q18.

As shown in FIG. 4, the reference voltage generator 44 is constituted of the operational amplifier OP5, the upper reference voltage generating resistor Rhigh, and the lower reference voltage generating resistor Rlow. Namely, regarding the operational amplifier OP5, an output Voutn from the sensor signal amplifier 12 is supplied to the non-inverting input terminal, and the output terminal directly connects to the inverting input terminal. Further, the upper reference voltage generating resistor Rhigh and the lower reference generating resistor Rlow connect to each other in series, and the output terminal of the operational amplifier OP5 connects to the common connecting part. Additionally, the terminal of the upper limit reference voltage generating resistor Rhigh connects to the drain of the MOS transistor Q15 and the output terminal 46, and the terminal of the lower limit reference voltage generating resistor Rlow connects to the drain of the MOS transistor Q17 and the output terminal 47.

As shown in FIG. 4, the current mirror circuit 45 is composed of the NMOS transistors Q17 and Q18, the gates of the MOS transistors Q17 and Q18 connect to each other, and the common connecting part connects to the drain of the MOS transistor Q18 and the drain of the MOS transistor Q16. Moreover, the drain of the MOS transistor Q17 connects to the terminal of the lower reference voltage generating resistor Rlow. Additionally, the sources of the MOS transistors Q17 and Q18 connect to the negative-side source line 52.

Referring to FIG. 4, the following will discuss the operation of the reference voltage generator 13 configured as above.

The MOS transistors Q11 and Q12 constitute the current mirror circuit, so that current mirror is performed on the current Iptat flowing the MOS transistor Q11 and an equal current flows between the source and drain of the MOS transistor Q12.

Meanwhile, the voltage Vbg is a constant voltage with temperature-independence. The voltage Vbg is supplied from the band gap reference voltage generator 8 to the operational amplifier OP4. Since the voltage Vbg is supplied to the MOS transistor Q13 via the operational amplifier OP4, a current of (Vbg/R3) flows between the source and drain of the MOS transistor Q13. Here, R3 denotes a resistance of the resistor R3.

Therefore, a current $I_{14}$ flowing between the source and drain of the MOS transistor Q14 is a difference between a current flowing through the MOS transistor Q13 and a current flowing through the MOS transistor Q12. The current $I_{14}$ is represented by the following equation (13) according to the equation (12).

$$I_{14} = (Vbg/R3) - K \cdot (T/R4) \tag{13}$$

Also, the PMOS transistors Q14, Q15, and Q16 have a current mirror relationship. Thus, when the mirror ratio is m, a current m times larger than the above current $I_{14}$ flows to the MOS transistors Q15, Q16, and Q18. Since the transistor Q17 has a mirror relationship with the transistor Q18, an equal current $I_{14} \times m$ flows to the transistor Q17, and the current $I_{14} \times m$ flows through the upper limit reference voltage generating resistor Rhigh and the lower limit reference voltage generating resistor Rlow. Consequently, an upper reference potential Vhigh and a lower reference potential Vlow, which are generated in the upper reference voltage generating resistor Rhigh and the lower reference voltage generating resistor Rlow, are represented by the following equations (14) and (15).

$$Vhigh = m \cdot \{(Vbg/R3) - K \cdot (T/R4)\} \cdot Rhigh + Voutn = -m \cdot K \cdot T \cdot (Rhigh/R4) + m \cdot Vbg \cdot (Rhigh/R3) + Voutn \tag{14}$$

$$Vlow = -m \cdot \{(Vbg/R3) - K \cdot (T/R4)\} \cdot Rlow + Voutn = m \cdot K \cdot (Rlow/R4) - m \cdot Vbg \cdot (Rlow/R3) + Voutn \tag{15}$$

Here, in the equations (14) and (15), Voutn represents a potential when a signal value amplified in the sensor signal amplifier 12 is 0. Further, the resistors R3, R4, Rhigh, and Rlow are equal in temperature coefficient. Thus, regarding the upper limit reference potential Vhigh and the lower limit reference potential Vlow, resistor is not affected by temperature change, so that the potentials are always set at a linear function of absolute temperature T. Moreover, the upper limit reference potential Vhigh and the lower limit reference potential Vlow can be generated as linear functions of arbitrary absolute temperatures only by changing the resistances of the resistors R3, R4, Rhigh, and Rlow, and a mirror ratio m.

Namely, of variety of sensors, regarding sensors being able to express an output with a linear function of absolute temperature in an ideal or approximate manner in case of driving with a constant voltage, only the values of the resistors R3, R4, Rhigh, and Rlow in the signal processing circuit 2 and a mirror ratio m are changed so as to form a sensor IC turning on/off at a fixed sensitivity all the time.

Also, particularly in the case where the resistors Rhigh and Rlow are equal in resistance and characteristic, the upper limit reference potential Vhigh and the lower reference potential Vlow can be set at perfectly symmetric values with respect to a 0 level (Voutn) of a signal amplified in the sensor signal amplifier 12. Here, as a reference signal, the temperature coefficients of the upper limit reference potential Vhigh and the lower limit reference potential Vlow will be discussed. Firstly, a temperature coefficient of a reference signal V is defined in the following manner. Namely, a reference signal is represented by V(T) at absolute temperature T(K). Assuming that a reference room temperature is T=300 K, a temperature coefficient α of the reference signal V(T) at temperature T(K) is definded by the following equation (16).

$$\alpha = (1/V(300)) \cdot \Delta V / \Delta T \tag{16}$$

Here, in the equation (16), $\Delta V$ represents an amount of change in reference signal and $\Delta T$ represents an amount of change in absolute temperature T.

According to the equation (16), if temperature coefficients of the upper limit reference potential Vhigh and the lower limit reference potential Vlow are found based on the equations (14) and (15), the temperature coefficients are constant regardless of temperature, as shown in the following equation (17).

$$\text{Temperature coefficients of Vhigh} = \text{temperature coefficients of Vlow} = K/(300 \cdot K - Vbg \cdot R4/R3) \tag{17}$$

Therefore, when an output signal from the sensor 1 is a linear function of absolute temperature, appropriate resistances can be set for the resistors R3 and R4, so that the temperature coefficients can be equal to that of the equation (17). Conversely, in the case of equal temperature coefficients, if an amplification factor of an output signal from the sensor 1, a mirror ratio m, and the resistors Rhigh and Rlow are provided appropriately, at a predetermined sensitivity, a temperature characteristic of an amplified signal of the signal from the sensor can be made equal to those of the equations (14) and (15). Namely, it is possible to form a sensor IC turning on/off at a fixed sensitivity all the time.

As described above, the sensor IC of the present embodiment is constituted of the sensor 1 and the signal processing circuit 2, which is formed on the semiconductor layer provided on the insulating substrate. Further, the sensor 1 changes the output linearly with absolute temperature. In response, the reference voltage generator 13 on the side of the sensor signal processing circuit 2 produces the reference voltages Vhigh and Vlow that changes the output at a temperature coefficient equal to that of the output of the sensor 1 and changes the output linearly with absolute temperature. The voltages are used as reference voltages used for making a comparison with an output voltage of the sensor signal amplifier 12 and for producing an on-off output. Furthermore, the sensor signal amplifier 12 has functions of amplifying the output signal from the sensor 1 with a temperature-independent amplification factor and canceling an offset voltage.

Therefore, according to the sensor IC of the present embodiment, it is possible to realize accurate temperature compensation over a wide temperature range from a low temperature to a high temperature, thereby achieving an accurate operation with reliability at a high temperature of 200° C. or above that has not been possible in the conventional art.

Further, according to the sensor IC of the present embodiment, in the case where the sensor 1 is a Hall element and the magnetic sensitive part is made of GaAs, since the resistor of the GaAs increases with temperature, current flowing to the magnetic sensitive part decreases and source current also decreases. Hence, the sensor IC decreases in power consumption with temperature and holds down the heat liberation, resulting in a stable operation at a high temperature.

Furthermore, in the signal processing circuit 2, which is an embodiment of an IC for the sensor of the present invention, the reference voltage generator 13 produces the reference voltages Vhigh and Vlow that changes in magnitude at a temperature coefficient equal to that of the output signal provided between the input terminals 19 and 20 from the sensor 1 and linearly with absolute temperature. The Schmidt trigger 14 uses the voltage as a reference voltage for comparing the output voltage of the sensor signal amplifier 12 to produce an on-off output. Moreover, the signal processing circuit 2 is formed on the semiconductor layer provided on the insulating substrate.

Therefore, according to the signal processing circuit 2 of the present embodiment, when one of the sensors changes the output linearly with absolute temperature, a reference signal is produced by a temperature linear function for the sensor, so that the signal processing circuit 2 can be combined with the sensor. In this case, according to the IC for the sensor IC of the present embodiment, accurate temperature compensation is possible on the output of the sensor over a wide temperature range from a low temperature and a high temperature, thereby achieving an accurate operation with reliability at a high temperature of 200° C. or above, which has not been possible in the conventional art.

Additionally, with the signal processing circuit of the present embodiment, it is possible to provide a magnetic sensor IC combined with a magnetic sensor used on a part having a high temperature and a large difference in temperature in an automobile and the like. And it is also possible to realize a variety of sensor IC that can be used at a high temperature by making combination with sensors such as a pressure sensor and a temperature sensor.

Moreover, in the sensor IC of the present embodiment, the sensor 1 is driven with a constant voltage generated by the sensor bias voltage generator 10, and the reference voltage generator 13 performs temperature compensation of the sensor 1. Thus, it is possible to reduce power consumption of the sensor 1 at a high temperature, thereby suppressing heat liberation at a high temperature. Consequently, a stable operation is possible even at a high temperature of 200° C. or above.

Here, although the above embodiment uses the Schmidt trigger 14 having hysteresis as a comparing means, a comparator having no hysteresis is also applicable instead.

Also, the Schmidt trigger 14 can be replaced with an A/D converter (analog/digital converter). In this case, an amplification signal of the sensor 1 is used as an analog input signal of the A/D converter. Further, the reference voltage generator 13 generates reference voltages that change the outputs at a temperature coefficient equal to that of the output from the sensor 1 and that change in magnitude linearly with absolute temperature. And then, the reference voltages are supplied to the A/D converter as reference voltages. The A/D converter uses the reference voltages to convert an input voltage to a digital signal.

Furthermore, in the above embodiment, the sensor changes the output linearly with absolute temperature and accordingly, the generated voltage of the reference voltage generator 13 changes linearly with absolute temperature. However, in the present invention, it is not always necessary to set a fixed temperature coefficient for the output of the sensor. In this case, the reference voltage generator 13 is configured to produce reference voltages changing at a temperature coefficient equal to that of the output from the sensor. For example, in the case where the temperature coefficient is not constant and the output of the sensor is produced curvilinearly with absolute temperature, the curving part can be divided into a plurality of sections so that the sections are made to approximate as a straight line. And, to be specific, for each of the sections approximating as a straight line, a plurality of circuits corresponding to the reference voltage generator 13 according to the section are provided. Analog switches are provided between the reference voltages Vhigh and Vlow and the Schmidt trigger 14 and the analog switches are switched in accordance with temperature to select the reference voltage. With this arrangement, it is always possible to produce a reference voltage in response to the output of the sensor and to respond to a sensor having an arbitrary temperature coefficient.

Here, according to the above embodiment, it is preferable that the sensor is a Hall element and the magnetic sensitive part of the Hall element is made of GaAs. However, in case of using a material like GaAs, whose resistance increases with temperature, as a component of the sensing section of the sensor, it is possible to achieve the same effect as GaAs.

Moreover, in the case of the above embodiment, it is preferable that an error of a temperature coefficient is 30% or less based on a permissible range of irregular densities of operating magnetic fluxes when the output of the sensor has a temperature coefficient of about 0.20%/°C. In the case of a larger temperature coefficient, the permissible range of an error is narrowed, and in the case of a smaller temperature coefficient, a permissible range of a temperature coefficient is greatly widened.

EXAMPLE 1

Next, a Hall IC manufactured as below will be discussed as Example 1 of the sensor IC of the present invention.

The Hall IC according to Example 1 is formed as follows: an IC including signal processing circuits shown in FIGS. 1 to 4 is formed on a SIMOX substrate including silicon oxide as an insulating base, by using CMOS process. Further, a crystalline silicon layer on the insulating base is 120 nm in thickness. Moreover, a switching period of offset compensation is set at $1/500$ (second) regarding the sensor signal amplifier 12 shown in FIGS. 2 and 3.

Next, as the sensor 1, the IC including the sensor signal amplifier 12 is combined with a Hall element whose magnetic sensitive part is made of GaAs (hereinafter, referred to as a GaAs Hall element), in a hybrid manner. Thus, the Hall IC is formed.

Figure 5:
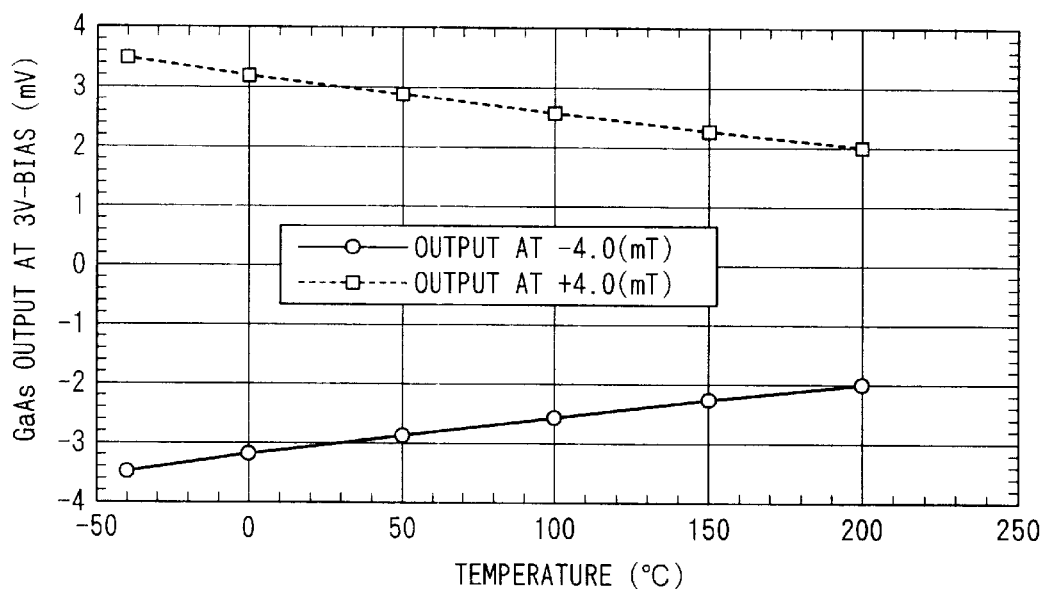
FIG. 5 is a diagram showing a temperature characteristic of a Hall voltage when a bias voltage is 3 (V) and a magnetic flux density is ±4 (mT) in a GaAs Hall element according to Example 1 of the present invention.

And then, a temperature-independent constant voltage 3 (V) is applied to the GaAs Hall element, an output characteristic is measured in a magnetic field of ±4 (mT), and measurement results of FIG. 5 are obtained.

As shown in FIG. 5, in the case of +4 (mT), a temperature coefficient of the output is a negative temperature coefficient of about −0.18 to −0.20%/°C. in a temperature range of −40° C. to 200° C., and the output can be expressed as a linear function of absolute temperature. Further, the output at −4 (mT) is substantially symmetric with respect to a temperature axis, as compared with an output at +4(mT).

Next, a bias voltage from the sensor bias voltage generator 10 of FIG. 1 is set at 3 (V), the voltage is applied to the GaAs Hall element, an amplification factor computed by the equation (8) of the sensor signal amplifier 12 is set at 50 times, and resistances of the resistors R3, Rhigh, and Rlow of the reference voltage generator 13 are respectively set at 23.81 (kΩ), 5.009 (kΩ), and 5.009 (kΩ) so as to meet a temperature characteristic of the output of the GaAs Hall element. Moreover, the constant voltage Vbg is set at 1.15 (V), and the constant K of the equation (12) is set at $2.69 \times 10^{-4}$ (A·Ω/K), and the resistance of the resistor R4 is set at 4.492 (kΩ). Also, the equations (14) and (15) express a mirror ratio m=1. Consequently, the equations (14) and (15) are expressed by the following equations (18) and (19).

$$V\text{high(mV)}=241.9-0.30 \cdot T \tag{18}$$

$$V\text{low(mV)}=-241.9+0.30 \cdot T \tag{19}$$

The results are substantially equal to 3V applied as a bias voltage shown in FIG. 5 and an output voltage of GaAs that is multiplied by 50 times in a magnetic field of 4 (mT). Additionally, at this moment, the temperature coefficients of the reference voltages Vhigh and Vlow are about −0.20%/°C., which is equal to that of GaAs.

Figure 6:
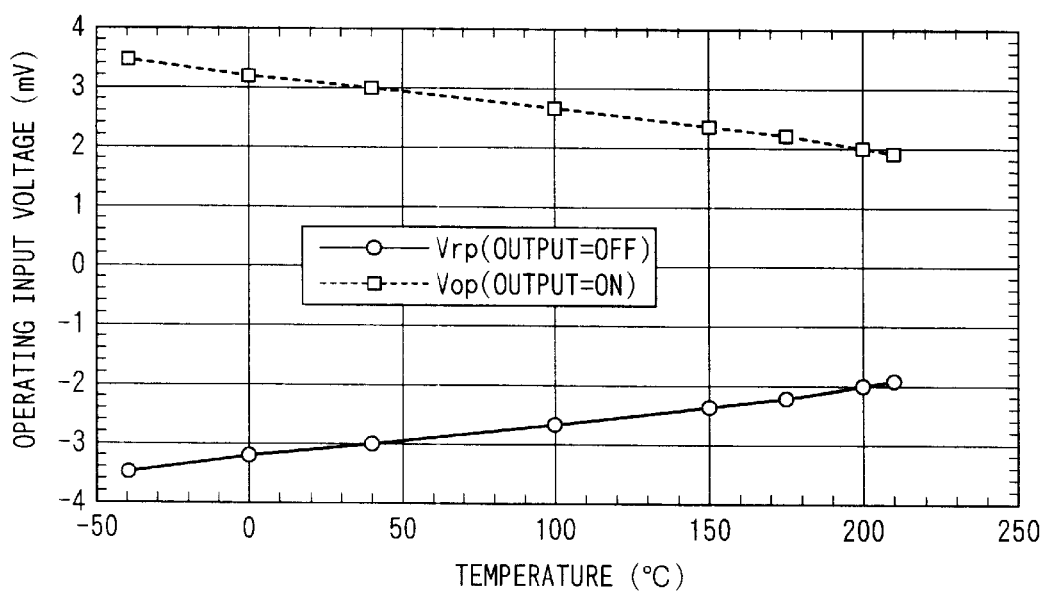
FIG. 6 is a diagram showing a temperature characteristic of an operating input voltage of the signal processing circuit according to Example 1 of the present invention.

FIG. 6 shows a temperature characteristic of an operating input voltage of the signal processing circuit 2 in the case of the operation under the above conditions. As shown in FIG. 6, the resistor Rhigh and the resistor Rlow are equal in resistance. Thus, it is possible to obtain an operating characteristic which is completely symmetric with respect to a temperature axis. In addition, it is found that the temperature characteristic is the same as that of the GaAs Hall element shown in FIG. 5. Further, in a temperature range of −40° C. to 200° C. or more, the offset voltage is small and a required characteristic symmetry to the temperature axis is realized.

Figure 7:
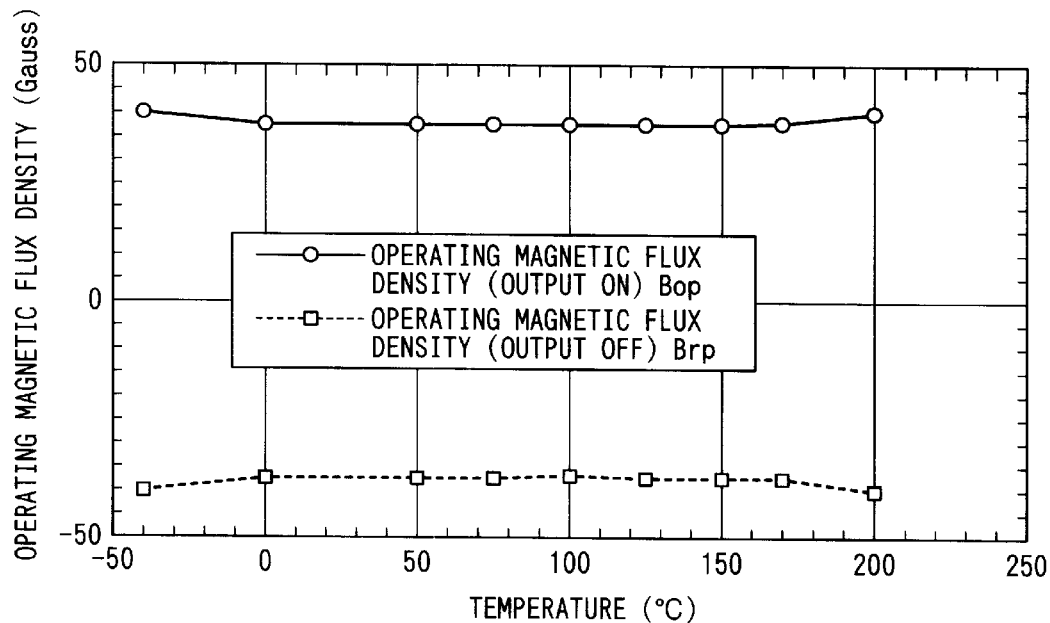
FIG. 7 is a diagram showing a temperature characteristic of an operating magnetic flux density of a Hall IC using the GaAs Hall element according to Example 1 of the present invention.

Consequently, as shown in FIG. 7, it is understood that the Hall IC of Example 1 is always turned on/off with magnitude of a constant magnetic field of ±4 (mT) in a temperature range of −40° C. to 200° C. and the Hall IC is superior in symmetry of operating points.

Figure 8:
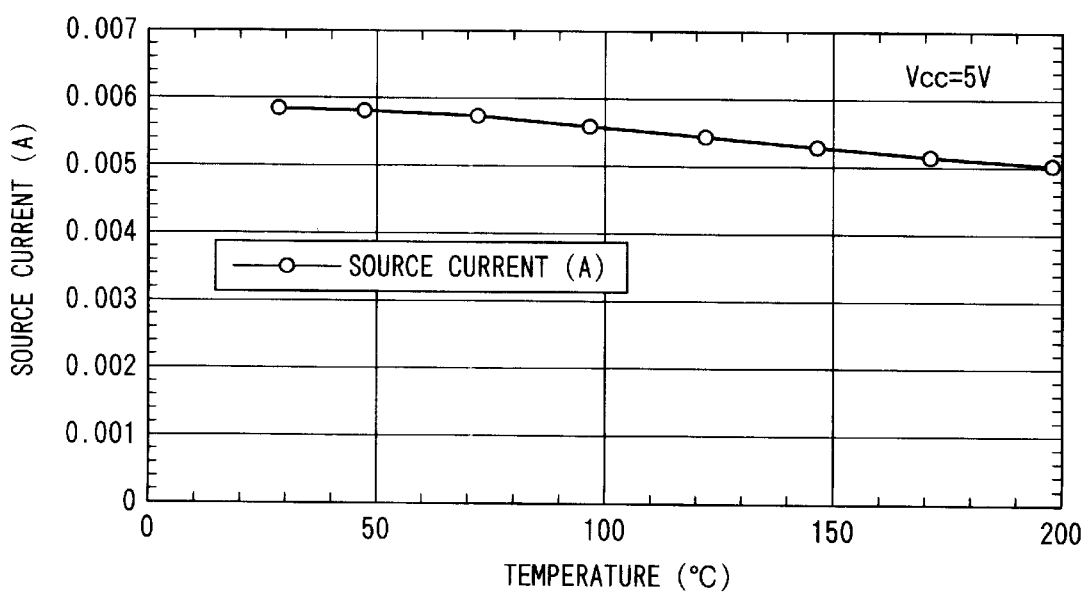
FIG. 8 is a diagram showing a temperature characteristic of source current when a source voltage is 5 (V) in the Hall IC using the GaAs Hall element according to Example 1 of the present invention.

FIG. 8 shows a temperature characteristic of a source current when a source voltage of the Hall IC of the present embodiment 1 is 5 (V). As shown in FIG. 8, an excellent characteristic can be realized such that the source current and the power consumption decrease with temperature. The source current decreases in this way for the following reason: the GaAs Hall element has the magnetic sensitive part made of GaAs and the resistance of the GaAs increases with temperature, thereby reducing current flowing to the magnetic sensitive part, and consequently, the source current decreases.

EXAMPLE 2

Referring to FIGS. 9 to 14, the following will discuss a rotation sensor IC for high temperatures that is used at a high temperature, as Example 2 of the sensor IC according to the present invention.

Figure 9:
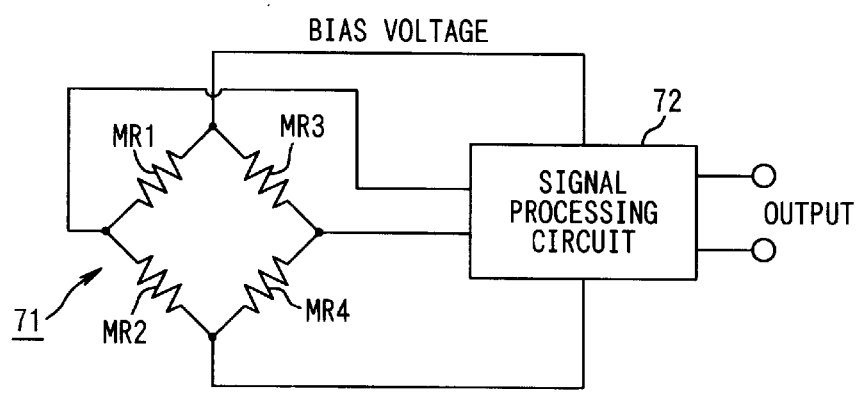
FIG. 9 is a diagram showing the configuration of a rotation sensor IC for high temperatures according to Example 2 of the present invention.

As shown in FIG. 9, the rotation sensor IC for high temperatures are constituted of a magnetic sensor 71 and a signal processing circuit 72 for processing an output signal of the magnetic sensor 71. The magnetic sensor 71 corresponds to the sensor 1 of FIG. 1, and the signal processing circuit 72 is identical to the signal processing circuit 2 of FIG. 1 in basic configuration. They are different from each other in the following points.

As shown in FIG. 9, the magnetic sensor 71 forms a bridge circuit using four magnetic resistor elements MR1 to MR4, and the four magnetic resistor elements MR1 to MR4 are disposed to act as detection sensors for rotation of a gear wheel as will be described later. In the bridge circuit, for example, a bias voltage of 1 (V) is supplied between bias voltage supplying terminals thereof from the signal processing circuit 72, and an output signal outputted from the output terminal of the circuit is inputted to the signal input terminal of the signal processing circuit 72.

Figure 10:
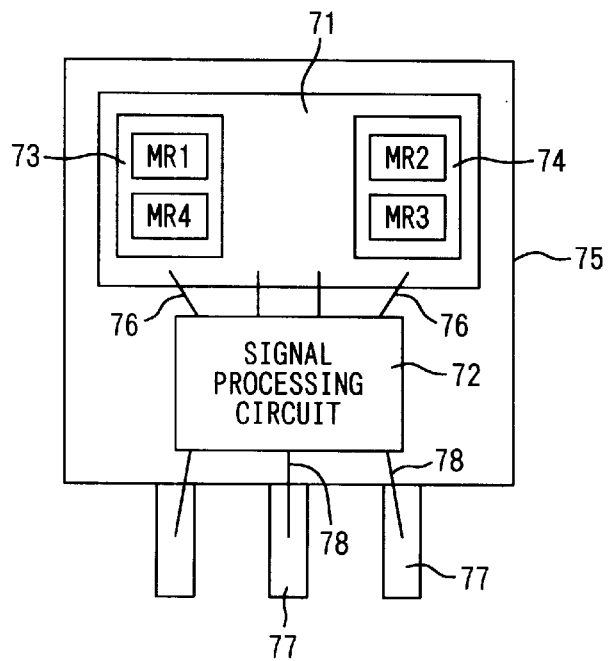
FIG. 10 is a diagram showing an example of arranging members in a package of the rotation sensor IC for high temperatures according to Example 2 of the present invention.

The magnetic sensor 71 and the signal processing circuit 72 formed as an integrated circuit are disposed (included) in a package 75, for example, as shown in FIG. 10. Regarding the magnetic resistor elements MR1 to MR4 constituting the magnetic sensor 71, as shown in FIG. 10, the magnetic resistor elements MR1 and MR4 are vertically disposed to form an A block 73, and the magnetic resistor elements MR2 and MR3 are vertically disposed to form a B block 74. A spacing between the A block 73 and the B block 74 corresponds to a spacing between a convex part and a concave part of a gear wheel 82, that will be discussed later. Furthermore, the magnetic sensor 71 and the signal processing circuit 72 are electrically connected to each other via wires 76, and the signal processing circuit 72 connects to pins 77, which connect to the outside, via wires 78.

Although the signal processing circuit 72 is substantially identical to the signal processing circuit 2 of FIG. 1 in basic configuration, the signal processing circuit 72 is different in the following point. As compared with the sensor IC using the foregoing GaAs Hall element, an amplification factor of the sensor signal amplifier 12 is changed as will be discussed later, and the reference voltage generator 13 is replaced with a reference voltage generator 79 shown in FIG. 11.

The signal processing circuit 72 is configured as above to handle a temperature coefficient as 0 regarding an output signal from the bridge circuit. Here, to adjust the temperature coefficient, the reference voltage generator 13 is replaced with the reference voltage generator 79. Thus, generated reference voltage has a temperature coefficient of 0.

Therefore, the reference voltage generator 79 is identical to the reference voltage generator 13 of FIG. 4 in basic configuration. However, the PMOS transistors Q11 and Q12 are omitted from the reference voltage generator 13 of FIG. 4. Additionally, other configurations of the reference voltage generator 79 are equal to those of the reference voltage generator 13 shown in FIG. 4. Hence, the same members are indicated by the same reference numerals and the description thereof is omitted.

Figure 12:
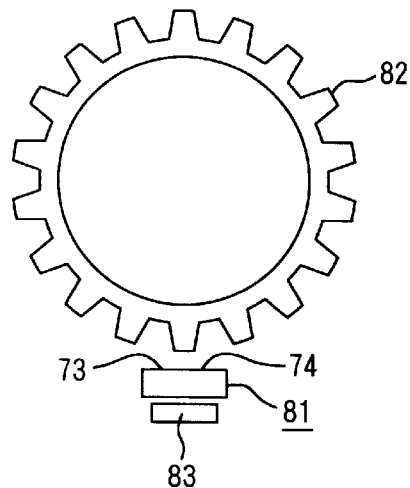
FIG. 12 is a diagram showing the configuration of a system for detecting a gear wheel that uses the rotation sensor IC for high temperatures according to Example 2 of the present invention.

Next, the following will discuss a rotation sensor 81 for high temperatures that is configured as above and is used for, e.g., detecting the rotation of a gear wheel and for a rotation detecting system, as shown in FIG. 12.

As shown in FIG. 12, in the rotation detecting system, the rotation sensor IC 81 for high temperatures is disposed at the outer edge of the gear wheel 82 such that blocks 73 and 74 of the sensor 71 are opposed to the outer surface. The gearwheel 82 is made of a ferromagnet and is disposed rotatively. On the back of the rotation sensor IC 81 for high temperatures, a samarium-cobalt magnet 83 is disposed for intensifying the magnetic property of the gear wheel 82 to readily detect a magnetic field. Also, to drive the bridge circuit of the sensor 71, a constant voltage of 1 (V) is supplied from the signal processing circuit 72. Moreover, a magnetic flux density detected in the A block 73 of the sensor 71 and a magnetic flux density detected in the B block 74 of the sensor 71 are taken out as voltage signals, and the voltage signals are inputted to the signal processing circuit 72.

Referring to FIG. 12, the following will discuss the principle of detecting rotation of the rotation detecting system having the above configuration.

Regarding the magnetic sensitive parts (magnetic resistor elements MR1 and MR4) of the A block 73 and the magnetic sensitive parts (magnetic resistor elements MR2 and MR3) of the B block 74, the magnetic flux densities vary in accordance with the rotation of the gear wheel 82 because the gear wheel 82 has convex and concave parts thereon. A difference between the densities of magnetic fluxes also varies in synchronization with the rotation. When a difference between the magnetic flux densities is larger than a fixed reference voltage value, an output signal of the signal processing circuit 2 is turned on, and when the difference is smaller than the reference value, the output signal is turned off.

Here, as for the signal processing circuit 72, the entire system including the gear wheel 82, the samarium-cobalt magnet 83, and the sensor 71 is a target of temperature compensation.

Figure 11:
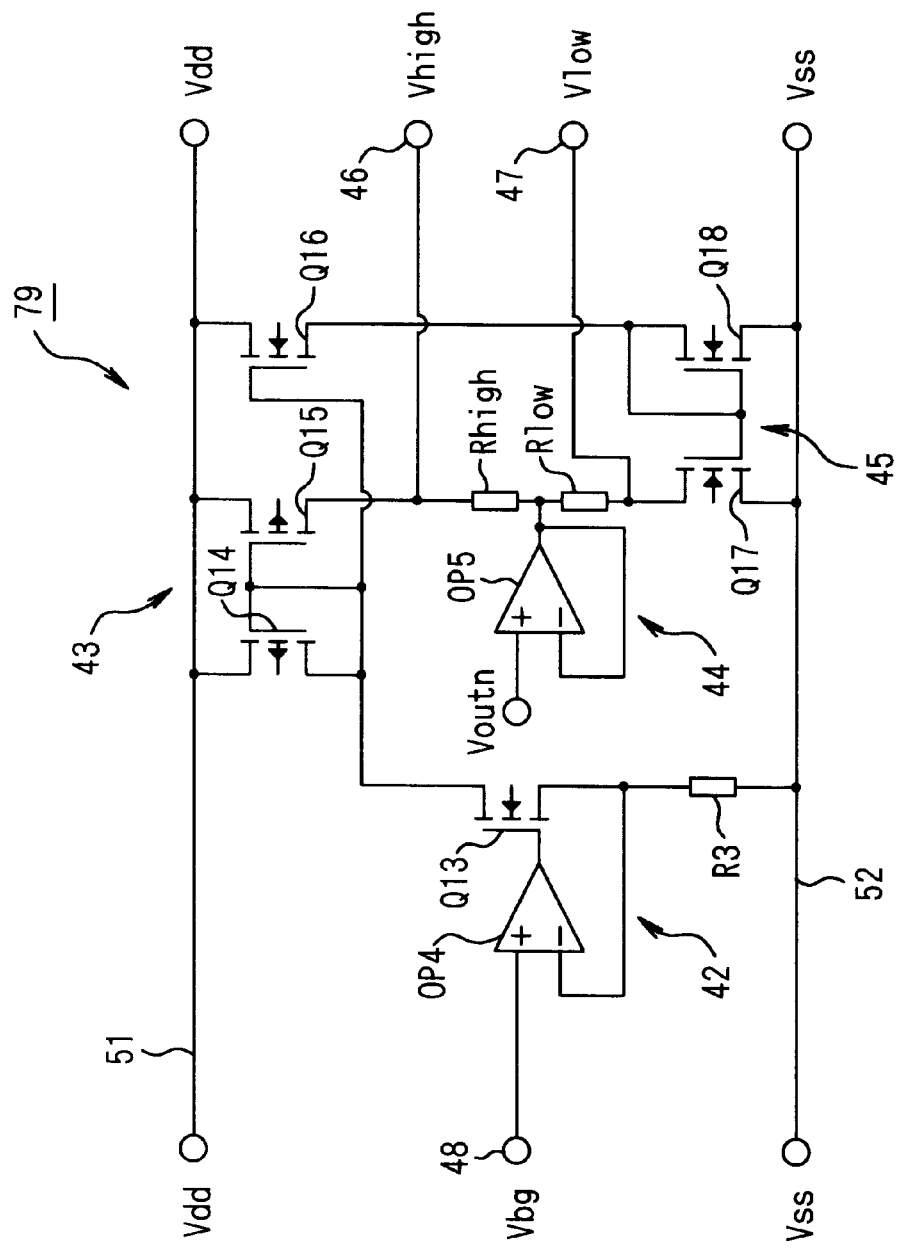
FIG. 11 is a circuit diagram showing a reference voltage generator in the rotation sensor IC for high temperatures according to Example 2 of the present invention.
Figure 13:
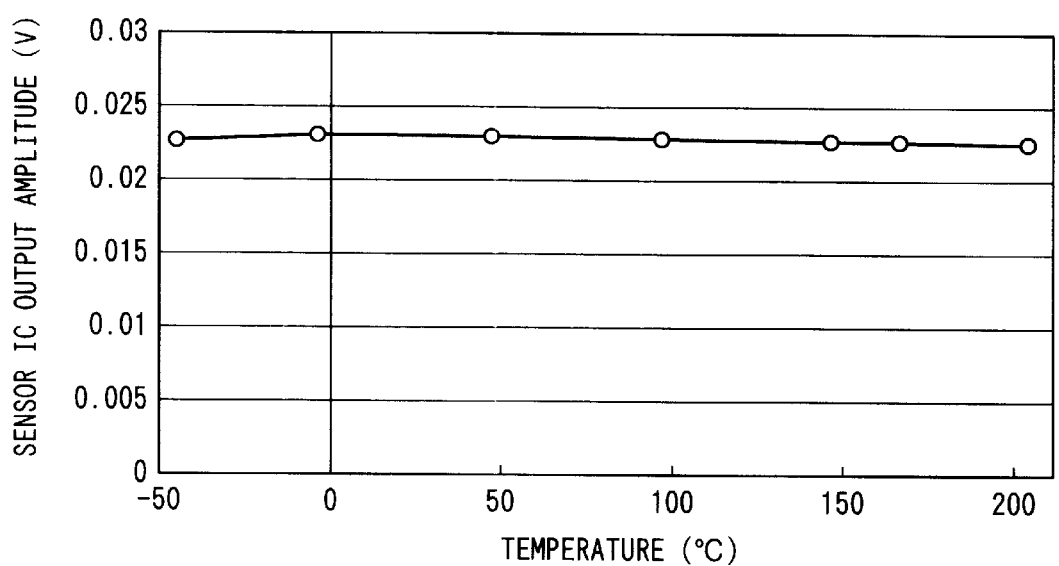
FIG. 13 is a diagram showing a change in temperature of amplitude of output from the rotation sensor IC for high temperatures according to Example 2 of the present invention.
Figure 14:
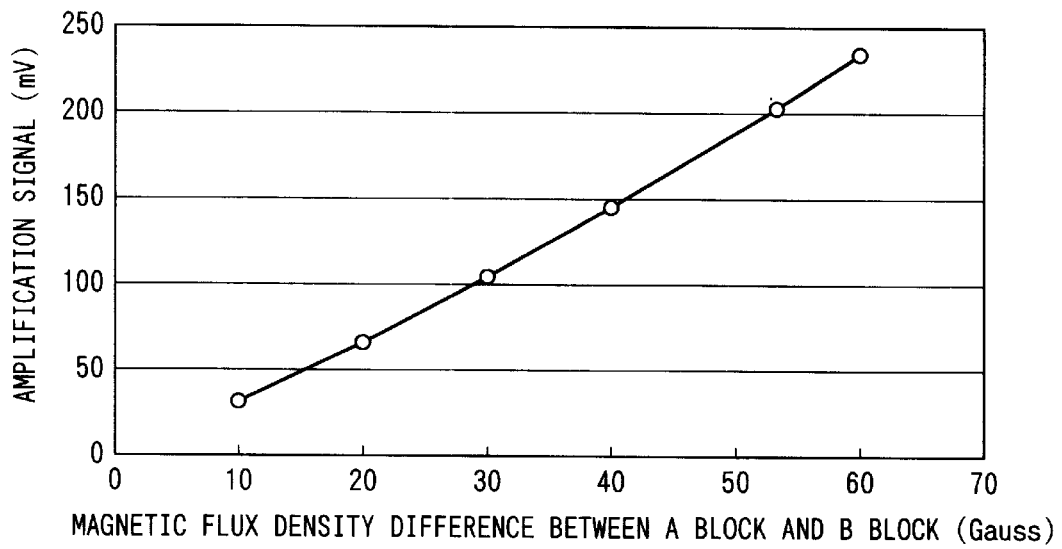
FIG. 14 is a diagram showing the relationship of a difference in magnetic flux density between an A block and a B block and an amplification signal of output from a bridge circuit in the rotation sensor IC for high temperature, according to Example 2 of the present invention.

FIG. 13 shows an output amplitude from the bridge circuit. The output amplitude is obtained when a constant voltage of 1 (V) is applied from the signal processing circuit 72 to the bridge circuit of the sensor 71 and the gear wheel 82 is rotated. In the sensor system, due to a change in temperature of the gear wheel 82, the magnet 83, or the bridge circuit, regarding the amplitude of the output signal, that is obtained when the gear wheel 82 is rotated, from the bridge circuit of the sensor 71, the magnitude of the amplitude and temperature coefficient is about −0.01%/°C. Therefore, considering a temperature range of −40° C. to 200° C., any problems do not occur in practical use even when the temperature coefficient is approximated to 0 within the temperature range. The reference voltage generator for temperature compensation can be configured as shown in FIG. 11, and a temperature coefficient of the generated comparative reference voltage can be set at 0.

Further, the magnetic flux densities acting upon the magnetic sensitive parts of the A block 73 and the B block 74 of the sensor 71 determine the parameter of the signal processing circuit 72 such that the output of the signal processing circuit 72 is turned on at +1.5 (mT) and is turned off at −1.5 (mT). The values of a resistor R3, an upper limit reference voltage generating resistor Rhigh, and a lower limit reference voltage generating resistor Rlow of the reference voltage generator 79 are set as follows: R3 ≈20 KΩ, Rhigh=780 Ω, and Rlow=780 106 .

Further, other parameters of the equations (14) and (15) are the same as those of the GaAs Hall IC.

At this moment, according to the equations (14) and (15), the reference voltages Vhigh and Vlow of the reference voltage generator 79 are computed as follows: Vhigh=+45 mV and Vlow=−45 mV. The reference voltages are compared with an amplified signal, which is produced by amplifying an output signal from the bridge circuit of FIG. 14 by 150 times in the sensor signal amplifier. The output of the signal processing circuit 72 is turned on/off according to the result. Thus, the output is switched at a magnetic flux density of 1.5 (mT) or more.

The rotation sensor IC for high temperatures configured as above in Example 2 can detect the rotation of the gear wheel without any problems at a high temperature of 200° C.

Additionally, like Example 2, a conventional sensor IC has been known, which uses a CMOS circuit in a silicon monolithic manner to detect the rotation of a gearwheel. The upper limit temperature is 150° C. in practical use. However, in Example 2, the practical upper limit temperature is 200° C. or above as mentioned above.

EXAMPLE 3

Referring to FIGS. 15 to 19, the following will discuss a pressure sensor IC for high temperatures that can be used at a high temperature, as Example 3 of the sensor IC of the present invention.

Figure 15:
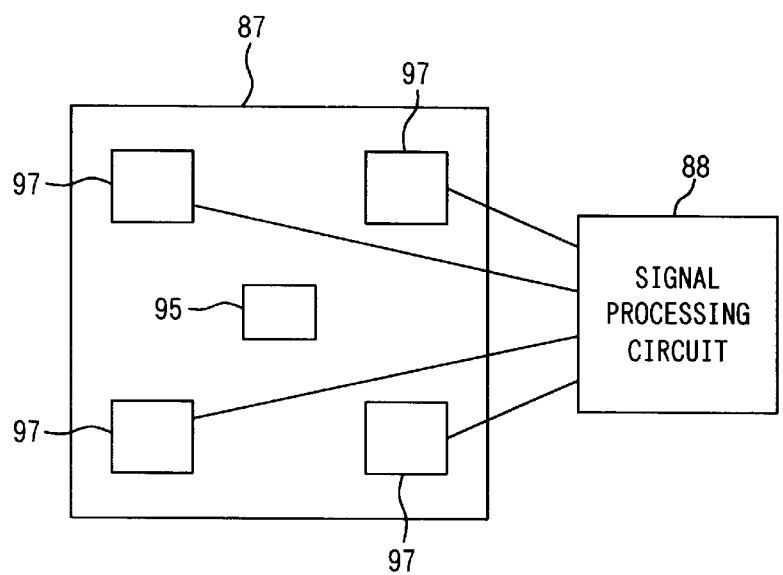
FIG. 15 is a diagram showing the configuration of a pressure sensor IC for high temperatures according to Example 3 of the present invention.

Conventionally, it has been known that the pressure sensor for high temperatures using a SOI (Silicon on Insulator) structure is applicable at a high temperature of 200° C. or above. Hence, as shown in FIG. 15, a pressure sensor 87 with the SOI structure and a signal processing circuit 88 are combined with each other, are included in the same package, and are used at a high temperature of 200° C. or above.

Although the signal processing circuit 88 is substantially identical to the signal processing circuit 2 of FIG. 1 in basic configuration, the signal processing circuit 88 is different in the following points. An amplification factor of the sensor signal amplifier 12 is changed as will discussed later, and the reference voltage generator 13 is replaced with a reference voltage generator 101 shown in FIG. 17. These points will be described later on.

Therefore, the reference voltage generator 101 is basically identical to the reference voltage generator 13 in configuration. However, the reference voltage generator 101 is different in the following points. The PMOS transistors Q11 and Q12 are omitted from the reference voltage generator 13 of FIG. 4, and the connection of the output terminal of the operational amplifier OP5 is changed from the common connecting point of the upper reference voltage generating resistor Rhigh and the lower reference voltage generating resistor Rlow to the drain of the MOS transistor Q17. Furthermore, the lower reference potential Vlow is taken out from the common connecting point. Additionally, other configurations of the reference voltage generator 101 is the same as those of the reference voltage generator 13 shown in FIG. 4, so that the same members are indicated by the same reference numerals and the description thereof is omitted.

Incidentally, it is difficult to use a piezoresistor pressure sensor using silicon diffused resistor at a high temperature due to leakage current caused by PN-junction. Hence, Example 3 adopts the pressure sensor 87 with the SOI structure shown in FIG. 16, achieving an operation at a high temperature of 200° C. or above.

Figure 16:
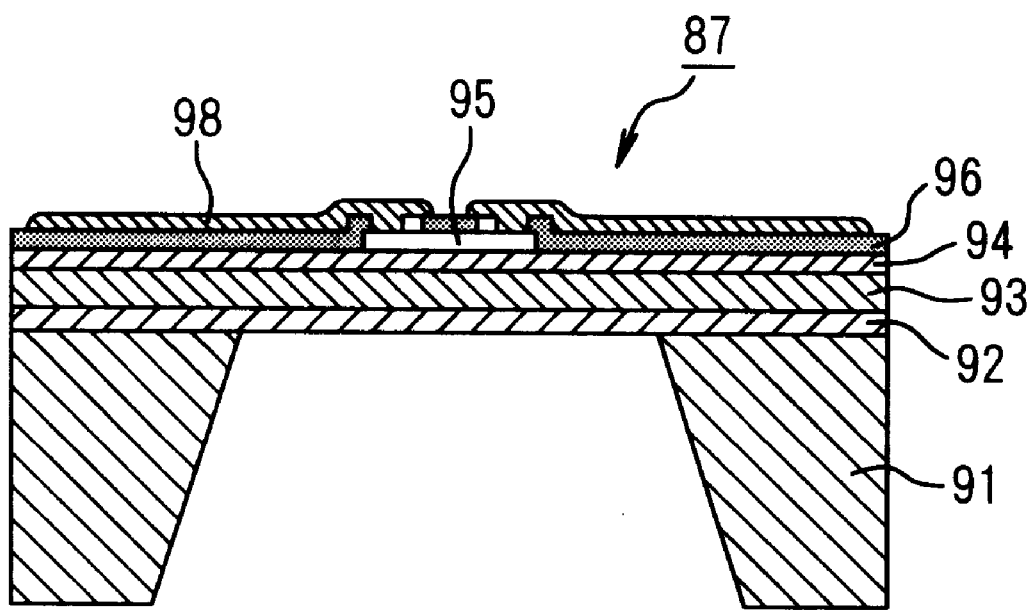
FIG. 16 is a sectional view showing the configuration of the pressure sensor IC for high temperatures according to Example of the present invention.

As shown in FIG. 16, in the pressure sensor 87, an aluminum oxide ($Al_2O_3$) film 92, a silicon film 93, and an aluminum oxide ($Al_2O_3$) film 94 are stacked in this order on a substrate 91, a piezoresistor element 95 is formed at the center of the aluminum oxide film 94, the surfaces of the aluminum oxide film 94 and the piezoresistor element 95 are covered with an oxide film ($SiO_2$) 96, and the piezoresistor element 95 and four terminals 97 are connected to each other via a metal 98 (see FIG. 15). Further, the four terminals 97 electrically connect to the signal processing circuit 88.

Figure 17:
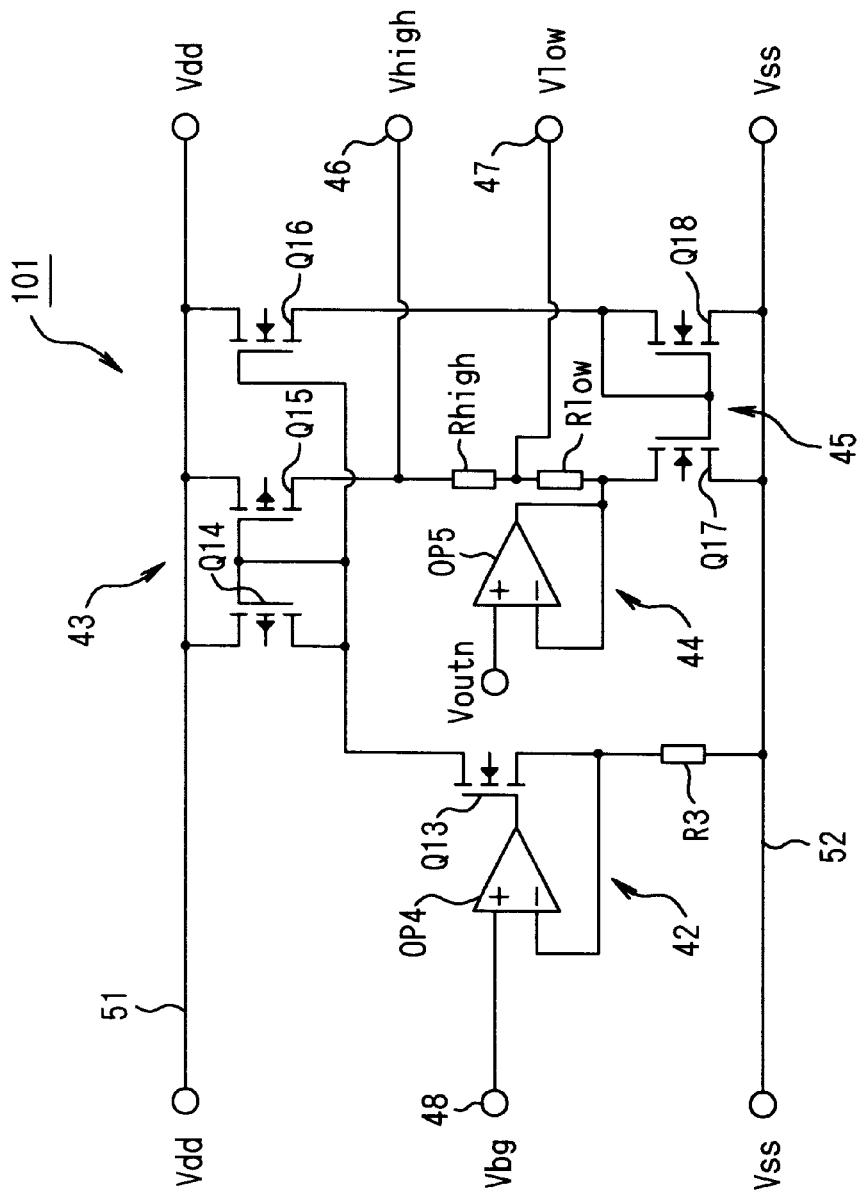
FIG. 17 is a circuit diagram showing a reference voltage generator in the pressure sensor IC for high temperature according to Example 3 of the present invention.
Figure 18:
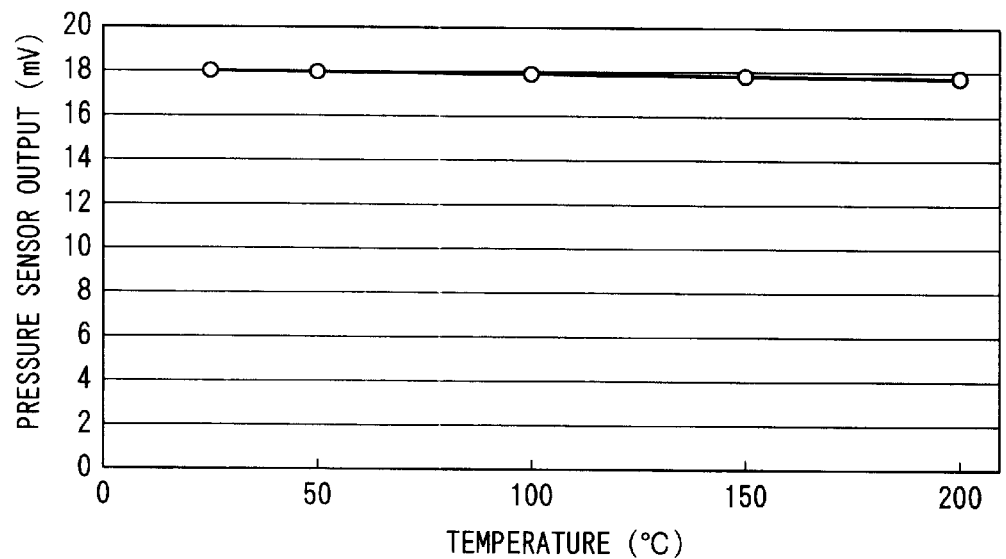
FIG. 18 is a diagram showing a temperature characteristic of an output of the pressure sensor for high temperatures according to Example 3 of the present invention.

FIG. 18 shows an output voltage relative to a temperature that is obtained when driving the pressure sensor 87 with a constant voltage of 3 V and applying the load of 0.05 Mpa (mega-pascal). According to FIG. 18, a practical temperature coefficient of the output voltage is about −0.01%/°C. Even when the temperature coefficient is approximately set at 0, any problems do not occur in practical use. Thus, it is possible to configure the reference voltage generator for temperature compensation as shown in FIG. 17 and to set at 0 the temperature coefficient of the produced comparative reference voltage.

Also, in Example 3, parameters of the signal processing circuit 88 are set such that the output of the signal processing circuit 88 is turned on at an operating pressure of 0.05 Mpa, and the output is turned off at the pressure of 0.04 Mpa. An amplification factor of the sensor signal circuit is set at 5 times, and the values of the resistor R3, the upper limit reference voltage generating resistor Rhigh, and the lower limit reference voltage generating resistor Rlow of the reference voltage generator 101 are set as follows: R3=20 KΩ, Rhigh=310 Ω, and Rlow=1250 Ω (other parameters are the same as those of the above GaAs Hall IC).

Figure 19:
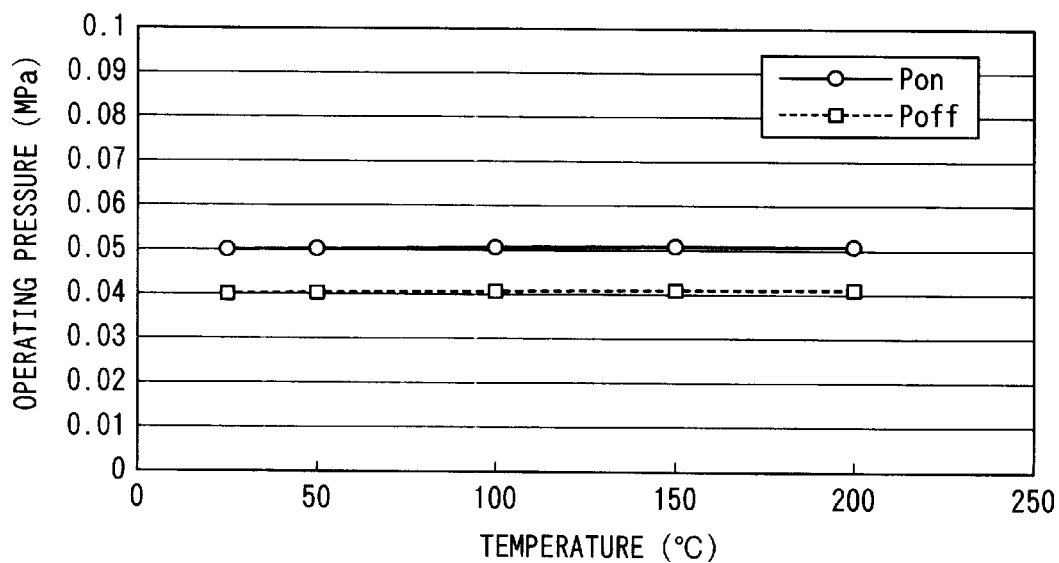
FIG. 19 is a diagram showing the relationship of a temperature and an operating pressure of the pressure sensor IC for high temperatures according to Example 3 of the present invention.

As shown in FIG. 19, in the pressure sensor IC for high temperature having such a configuration, the output is turned on at an operating pressure of 0.05 Mpa and the output is turned off at an operating pressure of 0.04 Mpa in the temperature range from a room temperature to 200° C. In FIG. 19, Pon represents an operating pressure for turning on the output and Poff represent an operating pressure for turning off the output.

The pressure sensor IC for high temperatures with such a configuration of Example 3 makes it possible to detect a pressure without any problems even at a high temperature of 200° C.

EXAMPLE 4

The examples of the present invention described the above-mentioned magnetic sensor IC and pressure sensor IC. However, as Example 4, it is expected to realize a temperature switch for switching in a temperature range of 100° C. to 200° C. with the combination of (1) an oxygen sensor switch for high temperatures using an electrochemical pump-type oxygen sensor having a porous layer and (2) a PTC thermistor made of a material such as a $BaTiO_3$ material.

As earlier mentioned, the IC for the sensor IC of the present invention can be combined with a variety of sensor elements. Such combination makes it possible to realize kinds of sensor ICs.

Generally, although it is necessary to design and manufacture the sensor IC according to the sensor, three parameters to be adjusted are an amplification factor, a temperature coefficient, and a bias voltage regarding the sensor IC of the present invention. Thus, the design is modified easily. Additionally, if a plurality of ICs are previously designed and manufactured with capability of temperature compensation at different amplification factors and temperature coefficients, in some combinations, typical sensor elements are more likely to form a sensor IC having preferable temperature compensation in a wide temperature range or in a part of a temperature range. In other words, the IC for the sensor IC of the present invention is applicable as a sensor IC for high temperatures for general purpose use.

Further, since the sensor and the signal processing circuit are mounted in the same package, it is possible to realize an IC sensor operating accurately with a smaller size.

INDUSTRIAL APPLICABILITY

As described above, according to an IC for a sensor IC of the present invention, an amplifying means inputs a sensor output signal of the sensor, amplifies the sensor output signal with a required amplification factor of temperature independence, and cancels an offset, thereby accurately amplifying the output signal of the sensor.

Moreover, a reference signal producing means produces a reference signal which varies at a temperature coefficient equal to that of the sensor output signal of the sensor. The signal is used as a reference, that of which a comparing means makes comparison with the magnitude of an amplification output signal of the amplifying means and outputs a required signal. Hence, even when an output signal of the sensor is changed due to the influence of temperature, it is possible to cancel the influence.

Further, the following configuration is made: the amplifying means, the reference signal producing means, the comparing means, and a constant voltage generating means are formed using a semiconductor layer provided on an insulating substrate, the semiconductor layer is preferably composed of a silicon thin film, and leakage current can be reduced in a high temperature range and latch-up can be prevented.

For this reason, in the IC for the sensor IC of the present invention, when one of sensors has an output changing at a temperature coefficient equal to that of the reference signal produced by the reference signal producing means, combination can be made with the sensor. In this case, over a wide temperature range from a low temperature to a high temperature (e.g., from −40° C. to 200° C. or above), temperature compensation can be performed accurately for the output of the sensor, achieving an accurate operation with reliability even at a high temperature.

Furthermore, in case of forming the sensor IC combined with the sensor, the IC for sensor IC of the present invention can be realized only by changing the components of the reference signal producing means according to a temperature characteristic of the sensor. Thus, combination is made with a variety of sensors, achieving wide applicability.

Also, according to the IC for the sensor IC of the present invention, the reference signal producing means is based on the previous measurement of a temperature coefficient of a sensor output signal of the sensor and produces a reference signal having the same temperature coefficient. The signal is used as a reference, that of which the comparing means makes comparison with the magnitude of an amplification output signal of the amplifying means and outputs a required signal. Hence, in the case where the sensor IC is configured with the combination of a sensor, accuracy of comparison can be improved.

Additionally, in the manufacturing and assembling, irregular characteristics of the sensor can be severely selected, and the reference signal producing means can produce a reference signal according to a characteristic peculiar to the manufactured sensor, thereby readily achieving a sensor IC with a desired specification by making combination with the sensor.

Moreover, according to the IC for sensor IC of the present invention, the reference signal producing means produces a reference signal having a temperature coefficient equal to that of the sensor output signal of the sensor and changing linearly with absolute temperature. The signal is used as a reference, that of which the comparing means makes comparison with the magnitude of the amplification output signal of the amplifying means and outputs a required signal.

For this reason, according to the IC for the sensor IC of the present invention, when one of the sensors has output changing linearly with absolute temperature, a reference signal provided by a linear function of absolute temperature is produced according to the sensor. Thus, combination can be made with the sensor. In this case, accurate temperature compensation can be realized for the output of the sensor over a wide temperature range from a low temperature to a high temperature, achieving accurate temperature compensation with reliability even at a high temperature. Moreover, even in a wide temperature range whose output is not a linear function but is approximate to a linear function, an accurate operation can be performed in the temperature range.

On the other hand, according to the sensor IC of the present invention, the amplifying means receives the sensor output signal of the sensor, amplifies the received signal at a required temperature-independent amplification factor and operates to cancel an offset, thereby accurately amplifying the sensor output signal.

Additionally, the reference signal producing means produces a reference signal varying at a temperature coefficient equal to that of the output signal of the sensor. The signal is used as a reference, that of which the comparing means makes comparison with the magnitude of the amplification output signal of the amplifying means and outputs a required signal. Thus, even when the output signal of the sensor is varied due to the influence of temperature, the influence can be cancelled.

Further, the following configuration is made: the amplifying means, the reference signal producing means, the comparing means, and a constant voltage generating means are formed using a semiconductor layer provided on an insulating substrate, the semiconductor layer is preferably composed of a silicon thin film, and leakage current can be reduced and latch-up can be prevented in a high-temperature range.

Hence, according to the sensor IC of the present invention, over a wide temperature range from a low temperature to a high temperature (e.g., from −40° C. to 200° C. or above), temperature compensation can be performed accurately for the output of the sensor, causing an accurate operation with reliability even at a high temperature.

Further, the sensor IC of the present invention is completed by the inventor et al. who considered a characteristic of GaAs having a resistance increasing with temperature and earnestly studied the characteristic for positive and effective use.

Therefore, according to the present invention, GaAs whose resistance increases with temperature is adopted as a magnetic sensitive part of a Hall element. Thus, it is possible to reduce current of the magnetic sensitive part and to reduce source current with temperature. Hence, the sensor IC decreases in power consumption with temperature, suppresses an increase in temperature that is caused by consumption of current, and operates in a stable manner even at a high temperature.

Furthermore, according to the sensor IC of the present invention, the reference signal producing means is based on the previous measurement of a temperature coefficient of the sensor output signal of the sensor and produces a reference signal having the same temperature coefficient. The signal is used as a reference, that of which the comparing means makes comparison with the magnitude of the amplification output signal of the amplifying means and outputs a required signal, thereby improving accuracy of temperature compensation.

Also, the sensor can be severely selected for each characteristic upon manufacturing and assembling and the reference signal producing means can produce a reference signal according to the selected characteristic of the sensor. Thus, it is possible to readily realize a sensor IC having a desired specification by making combination with the sensor.

Moreover, according to the sensor IC of the present invention, the reference signal producing means is equal to the sensor output signal in temperature coefficient and produces a reference signal changing linearly with absolute temperature. The signal is used as a reference, that of which the comparing means makes comparison with the magnitude of the amplification output signal of the amplifying means and outputs a required signal. Even when the output signal of the sensor is changed due to the influence of the temperature, the influence can be cancelled.

For this reason, it is possible to realize accurate temperature compensation for the output of the sensor over a wide temperature range from a low temperature to a high temperature, achieving an accurate operation with reliability even at a high temperature. Additionally, even in a wide temperature range whose output is not a linear function but is approximate to a linear function, an accurate operation can be achieved in the temperature range.

What is claimed is:

1. A semiconductor device comprising:
   amplifying means for receiving a sensor output signal from a sensor, amplifying the sensor output signal at a required temperature-independent amplification factor, and canceling an offset,
   reference signal producing means for producing a reference signal varying at a temperature coefficient equal to that of the sensor signal from said sensor,
   comparing means which compares a magnitude of an amplification output signal from said amplifying means with that of the reference signal from said reference signal producing means and outputs a required signal according to a comparison result, and
   constant voltage generating means for generating temperature-independent constant voltage to be supplied to said sensor,
   characterized in that said amplifying means, said reference signal producing means, said comparing means, and said constant voltage generating means are formed using a semiconductor layer provided on an insulating substrate.

2. The semiconductor device according to claim 1, characterized in that said semiconductor layer is composed of a silicon thin film.

3. The semiconductor device according to claim 2, characterized in that said silicon thin film is 30 nm to 1000 nm in thickness.

4. The semiconductor device according to claim 1, 2, or 3, characterized in that said reference signal producing means is based on the previous measurement of a temperature coefficient of the sensor output signal of said sensor and produces a reference signal having an equal temperature coefficient.

5. The semiconductor device according to claim 4, characterized in that said reference signal changes linearly with absolute temperature.

6. The semiconductor device according to claim 1, characterized in that said amplifying means includes signal amplifying means which is composed of a plurality of operational amplifiers and amplifies said sensor output signal at a temperature-independent amplification factor, and offset compensating means for compensating for each offset of said plurality of operational amplifiers every predetermined period.

7. The semiconductor device according to claim 6, characterized in that said operational amplifier includes a differential amplifying section for performing differential amplification on said sensor output signal and an offset compensating section for canceling an offset voltage of said differential amplifying section,
   and said offset compensating section receives an offset compensating signal according to an offset voltage of said differential amplifying section every predetermined period and cancels the offset voltage of said differential amplifying section in response to the offset compensation signal.

8. The semiconductor device according to claim 7, characterized in that said offset compensation section further includes a capacitor, which holds a voltage for canceling an offset voltage of said differential amplifying section,
   and said capacitor periodically holds a voltage according to the offset voltage of said differential amplifying section, and said offset compensating section cancels the offset voltage of said differential amplifying section according to the held voltage.

9. The semiconductor device according to claim 1, characterized in that said comparing means compares a magnitude of an amplification output signal from said amplifying means with those of two reference voltages, and the output is turned on/off according to a comparison result.

10. The semiconductor device according to claim 1, characterized in that said comparing means computes a ratio of a magnitude of reference voltage between that of the amplification output signal from said amplifying means and outputs a digital signal according to the ratio.

11. The semiconductor device according to claim 1, characterized in that said reference signal producing means includes at least a constant voltage source for generating temperature-independent constant voltage and
   a constant current source for generating constant current being directly proportional to absolute temperature and inversely proportional to the resistance of a reference resistor,
   and said reference signal producing means produces two reference voltage changing linearly with absolute temperature, according to the constant voltage generated in said constant voltage source and the constant current generated in said constant current source.

12. The semiconductor device according to claim 1, characterized in that said reference signal producing means includes a first constant current source for generating a constant current being directly proportional to absolute temperature and inversely proportional to the resistance of reference resistor,
   a second constant current source which is connected in series to said first constant current source and generates constant current by applying temperature-independent constant voltage to voltage/current converting resistor.
   a third constant current source for generating constant current being fixed times larger than a different between a current of the second constant current source and a current of said first constant current source, and
   an upper limit reference voltage generating resistor and a lower limit reference voltage generating resistor which are connected in series to said third constant current source and are applied constant current from said third constant current source,
   and one or both of potentials generated in said upper limit reference voltage generating resistor and said lower limit reference voltage generating resistor are taken out as reference potentials.

13. The semiconductor device according to claim 12, characterized in that said reference resistor, said voltage/current converting resistor, said upper limit reference voltage generating resistor, and said lower limit reference voltage generating resistor are equal to one another in temperature coefficient.

14. A semiconductor device comprising a sensor which converts a measured physical quantity to an electric signal and outputs the signal, which has a peculiar temperature coefficient, amplifying means which receives a sensor output signal of said sensor, amplifies the sensor output signal at a required amplification factor of temperature independence, and cancels an offset, reference signal producing means for producing a reference signal varying at a temperature coefficient equal to that of the sensor output signal of said sensor, comparing means for comparing a magnitude of the amplification output signal from said amplifying means with a magnitude of the reference signal from said reference signal producing means and for outputting a required signal according to a comparison result, and constant voltage generating means for generating temperature-independent constant voltage to be supplied to said sensor, characterized in that said amplifying means, said reference signal producing means, said comparing means, and said constant voltage generating means are formed using a semiconductor layer provided on an insulating substrate.

15. The semiconductor device according to claim 14, characterized in that said semiconductor layer is a silicon thin film.

16. The semiconductor device according to claim 15, characterized in that said silicon thin film is 30 nm to 1000 nm in thickness.

17. The semiconductor device according to claim 14, 15, or 16, characterized in that a sensor output signal has a peculiar temperature coefficient in said sensor and the sensor output signal is produced in a linear function of absolute temperature.

18. The semiconductor device according to claim 14, characterized in that said sensor is a magnetic sensor.

19. The semiconductor device according to claim 18, characterized in that said magnetic sensor is a Hall element.

20. The semiconductor device according to claim 19, characterized in that said Hall element has a magnetic sensitive part made of GaAs.

21. The semiconductor device according to claim 14, characterized in that said reference signal producing means is based on the previous measurement of a temperature coefficient of the sensor output signal of said sensor and produces a reference signal having an equal temperature coefficient.

22. The semiconductor device according to claim 21, characterized in that said reference signal changes linearly with absolute temperature.

23. The semiconductor device according to claim 14, characterized in that said amplifying means includes signal amplifying means which is composed of a plurality of operational amplifies and amplifies a sensor output signal at a temperature-independent amplification factor, and offset compensating means for compensating for each offset of said plurality of operational amplifiers every predetermined period.

24. The semiconductor device according to claim 23, characterized in that said operational amplifier includes a differential amplifying section for performing differential amplification on said sensor output signal and an offset compensating section for canceling an offset voltage of said differential amplifying section, and said offset compensating section receives an offset compensating signal according to an offset voltage of said differential amplifying section every predetermined period and cancels the offset voltage of said differential amplifying section in response to the offset compensation signal.

25. The semiconductor device according to claim 24, characterized in that said offset compensation section further includes a capacitor, which holds voltage for canceling an offset voltage of said differential amplifying section, and said capacitor periodically holds a voltage according to the offset voltage of said differential amplifying section, and said offset compensating section cancels the offset voltage of said differential amplifying section according to the held voltage.

26. The semiconductor device according to claim 14, characterized in that said comparing means compares a magnitude of an amplification output signal from said amplifying means with the magnitudes of two reference voltages, and the output is turned on/off according to a comparison result.

27. The semiconductor device according to claim 14, characterized in that said comparing means computes a ratio of a magnitude of reference voltage between that of the amplification output signal from said amplifying means and outputs a digital signal according to the ratio.

28. The semiconductor device according to claim 14, characterized in that said reference signal producing means includes at least a constant voltage source for generating temperature-independent constant voltage and a constant current source for generating constant current being directly proportional to absolute temperature and inversely proportional to the magnitude of a reference resistor, and said reference signal producing means produces two reference voltages changing linearly with absolute temperature, according to the constant voltage generated in said constant voltage source and the constant current generated in said constant current source.

29. The semiconductor device according to claim 14, characterized in that said reference signal producing means includes a first constant current source for generating a constant current being directly proportional to absolute temperature and inversely proportional to a magnitude of reference resistor, a second constant current source which is connected in series to said first constant current source and generates constant current b applying temperature-independent constant voltage to a voltage/current converting resistor, a third constant current source for generating constant current being fixed times larger than a difference between a current of the second constant current source and a current of said first constant current source, and an upper limit reference voltage generating resistor and a lower limit reference voltage generating resistor which are connected in series to said third constant current source and are applied constant current from said third constant current source, and one or both of potentials generated in said upper limit reference voltage generating resistor and said lower limit reference voltage generating resistor are taken out as reference electric potentials.

30. The semiconductor device according to claim 29, characterized in that said reference resistor, said voltage/current converting resistor, said upper limit reference voltage generating resistor, and said lower limit reference voltage generating resistor are equal to one another in temperature coefficient.

\* \* \* \* \*